United States Patent
Gillies et al.

(10) Patent No.: US 9,026,671 B2
(45) Date of Patent: May 5, 2015

(54) IP BROADCAST STREAMING SERVICES DISTRIBUTION USING FILE DELIVERY METHODS

(75) Inventors: Donald W. Gillies, San Diego, CA (US); Charles N. Lo, San Diego, CA (US); Michael G. Luby, Berkeley, CA (US); Thomas Stockhammer, Bergen (DE)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 13/439,518

(22) Filed: Apr. 4, 2012

(65) Prior Publication Data

US 2012/0259994 A1    Oct. 11, 2012

Related U.S. Application Data

(60) Provisional application No. 61/472,116, filed on Apr. 5, 2011.

(51) Int. Cl.
*G06F 15/16* (2006.01)
*H04L 12/18* (2006.01)
*H04L 29/06* (2006.01)

(52) U.S. Cl.
CPC .......... *H04L 12/189* (2013.01); *H04L 12/1836* (2013.01); *H04L 12/1881* (2013.01); *H04L 65/4076* (2013.01); *H04L 65/1083* (2013.01); *H04L 65/4084* (2013.01); *H04L 65/80* (2013.01)

(58) Field of Classification Search
USPC ........................................................ 709/231
See application file for complete search history.

(56) References Cited

U.S. PATENT DOCUMENTS

| 7,055,169 | B2 * | 5/2006 | Delpuch et al. | 725/100 |
|---|---|---|---|---|
| 7,793,329 | B2 | 9/2010 | Joshi et al. | |
| 2004/0139480 | A1 * | 7/2004 | Delpuch et al. | 725/135 |
| 2006/0059267 | A1 * | 3/2006 | Cugi et al. | 709/230 |
| 2007/0147411 | A1 * | 6/2007 | Bijwaard et al. | 370/432 |

(Continued)

FOREIGN PATENT DOCUMENTS

| EP | 2200220 A1 | 6/2010 |
|---|---|---|
| JP | 2009539304 A | 11/2009 |

(Continued)

OTHER PUBLICATIONS

3GPP TS 26.234 V9.1.0, 3rd Generation Partnership Project; Technical Specification Group Services and System Aspects; Transparent end-to-end packet switched streaming service (PSS); (Release 9), Dec. 2009, 179 pp.

(Continued)

*Primary Examiner* — Tauqir Hussain

(57) ABSTRACT

In one example, a device includes one or more processing units configured to send, via a network, a request to retrieve at least a portion of media content, wherein the media content conforms to dynamic adaptive streaming over HTTP (DASH), and wherein the request comprises a request that the at least portion be delivered according to a file delivery service, and, in response to the request, to receive streaming data for the at least portion of the media content in accordance with the file delivery service over the network. The device may prepopulate a browser cache with the received data, such that a browser can, in effect, stream data using the file delivery service. The device may initially retrieve data of the media content using unicast, until a switch point of the data received via the file delivery service is reached.

58 Claims, 10 Drawing Sheets

(56) References Cited

U.S. PATENT DOCUMENTS

| | | | | |
|---|---|---|---|---|
| 2007/0156815 | A1* | 7/2007 | Mate et al. | 709/204 |
| 2009/0198827 | A1 | 8/2009 | Hughes | |
| 2009/0268648 | A1* | 10/2009 | Tardy et al. | 370/310 |
| 2009/0291631 | A1* | 11/2009 | Xue et al. | 455/3.01 |
| 2010/0050032 | A1* | 2/2010 | Bichot et al. | 714/746 |
| 2010/0138876 | A1 | 6/2010 | Sullivan et al. | |
| 2011/0032832 | A1 | 2/2011 | Jalali et al. | |
| 2011/0255458 | A1* | 10/2011 | Chen et al. | 370/312 |
| 2012/0191548 | A1* | 7/2012 | Des Jardins et al. | 705/14.68 |
| 2012/0320814 | A1* | 12/2012 | Chen et al. | 370/312 |
| 2013/0067109 | A1* | 3/2013 | Dong et al. | 709/231 |

FOREIGN PATENT DOCUMENTS

| | | |
|---|---|---|
| WO | 2006111635 A1 | 10/2006 |
| WO | WO-2008084441 A1 | 7/2008 |
| WO | WO-2010072567 A1 | 7/2010 |
| WO | WO-2011038028 A2 | 3/2011 |

OTHER PUBLICATIONS

3GPP TS 26.244 V9.1.0, 3rd Generation Partnership Project; Technical Specification Group Services and System Aspects; Transparent end-to-end packet switched streaming service (PSS); 3GPP file format (3GP), (Release 9), Mar. 2010, 55 pp.

Bernie Arnason, "Report: Netflix Represents 30% of Peak Internet Traffic", Telecompetitor, May 17, 2011, Slide 1-6, http://www.telecompetitor.com/report-netflix-represents-30-of-peak-internet-traffic/.

Cain B. et al., "Internet Group Management Protocol, Version 3", Network Working Group, RFC 3376, Oct. 2002, p. 53.

Chen et al., "Response to the CfP on HTTP Streaming: Adaptive Video Streaming based on AVC", 93. MPEG Meeting; Jul. 26, 2010-Jul. 30, 2010; Geneva; (Motion Picture Expert Group or ISO/IEC JTC1/SC29/WG11), No. M17909, Jul. 26, 2010, XP030046499.

Deering S. et al., "Multicast Listener Discovery (MLD) for IPv6", Network Working Group, RFC 2710, p. 22, Oct. 1999.

ETSI TS 126 247, v10.0.0 (Jun. 2011), 3rd Generation Partnership Project; Universal Mobile Telecommunications System (UMTS); LTE; Transparent end-to-end Packet-switched Streaming Service (PSS); Progressive Download and Dynamic Adaptive Streaming over HTTP (3GP-DASH) (3GPP TS 26.247 version 10.0.0 Release 10), 96 pages.

Fielding, et al., "Hypertext Transfer Protocol-HTTP/1.1", pp. 1-6, 30-34, 152-154 (Jan. 1997).

Fielding et al., "RFC 2616: Hypertext Transfer Protocol HTTP/1.1", Internet Citation, Jun. 1999, pp. 165, XP002196143, Retrieved from the Internet: URL:http://www.rfc-editor-org/ [retrieved on Apr. 15, 2002].

Holbrook H. et al., "Using Internet Group Management Protocol Version 3 (IGMPv3) and Multicast Listener Discovery Protocol Version 2 (MLDv2) for Source-Specific Multicast", Network Working Group, RFC 4604, p. 11, Aug. 2006.

International Search Report and Written Opinion—PCT/US2012/032399—ISA/EPO—Jul. 4, 2012.

International Standard ISO/IEC 14496-12, Information Technology—Coding of audio-visual objects—Part 12: ISO base media file format, Third Edition, Oct. 15, 2008, 120 pp.

ISO/IEC JTC 1/SC 29; ISO/IEC FCD 23001-06, "Information Technology—MPEG Systems Technologies—Part 6: Dynamic Adaptive Streaming Over HTTP (DASH)," Jan. 28, 2011, 86 pages.

Luby Digital Fountain A Shokrollahi Epfl M Watson Digital Fountain T Stockhammer Nomor Research M: "Raptor Forward Error Correction Scheme for Object Delivery; rfc5053.txt", IETF Standard, Internet Engineering Task Force, IETF, CH, Oct. 1, 2007, XP015055125, ISSN: 0000-0003.

Nokia Corp., "Usage of 'mfra' box for Random Access and Seeking," S4-AHI127, 3GPP TSG-SA4 Ad-Hoc Meeting, Dec. 14-16, 2009, Paris, FR, 2 pp.

Paila et al., "FLUTE—File Delivery over Unidirectional Transport", Network Working Group, RFC 3926, Oct. 1, 2004, The Internet Society, XP015009699, ISSN: 0000-0003.

Rezaei, M., et al., (Mar. 2007). "Tune-in Time Reduction in Video Streaming Over DVB-H," IEEE Transactions on Broadcasting, 53(1), pp. 320-328. doi: 10.1-109 /TBC.2006.889682.

Schulzrinne, et al., "RTP: A Transport Protocol for Real-Time Applications", rfc3550.txt, Jul. 1, 2003, XP015009332, ISSN: 0000-0003.

Stockhammer, "WD 0.1 of 23001-6 Dynamic Adaptive Streaming over HTTP (DASH)", MPEG-4 Systems, International Organisation for Standardisation, ISO/IEC JTC1/SC29/WG11, Coding of Moving Pictures and Audio, MPEG 2010 Geneva/m11398, Jan. 6, 2011, 16 pp.

Watson, M., et, al. "Asynchronous Layered Coding (ALC) Protocol Instantiation", IETF RFC 5775, pp. 1-23, (Apr. 2010).

Wenger, et al., RFC 3984, "RTP Payload Format for H.264 Video," Feb. 2005, 84 pp.

* cited by examiner

FIG. 7

| SERVICE ANNC. & METADATA 204 | ASSOCIATED-DELIVERY PROCEDURES 206 | | MBMS SECURITY 212 | | | | | | |
|---|---|---|---|---|---|---|---|---|---|
| | PTP FILE REPAIR 208 | RECEPTION REPORTING 210 | REGIS-TRATION 214 | MSK 216 | | | | | |
| | HTTP 218 | | HTTP DIGEST 220 | | | | | | |
| | | | | MI-KEY 222 | | | | | |
| | TCP 224 | | | UDP 226 | | | | | |
| | IP (UNICAST) 228 | | | | | | | | |
| | PTP BEARER 230 | | | | | | | | |

200A ↑  APPLICATION(S) 202  ↓ 200B

| MBMS SECURITY 232 | STREAMING CODECS 240 | 3GPP FILE FORMAT 244 | ASSOC-DEL. PROCEDURES 246 | | SERVICE ANNC. & METADATA 250 |
|---|---|---|---|---|---|
| MTK 234 | DASH FILE FORMAT 242 | | PTM FILE REPAIR 248 | | |
| MIKEY 236 | | | FLUTE 252 | | |
| | | | ALC 254 | | |
| FEC 238 | | LCT 256 | | CC 258 | FEC 260 |
| IP (MULTICAST) OR IP (UNICAST) 262 | | | | | |
| MBMS OR PTP BEARER(S) 264 | | | | | |

IP BROADCAST STREAMING SERVICES DISTRIBUTION USING FILE DELIVERY METHODS

This application claims the benefit of U.S. Provisional Application No. 61/472,116, filed Apr. 5, 2011, which is hereby incorporated by reference in its entirety.

TECHNICAL FIELD

This disclosure relates to transport of coded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

After video data has been encoded, the video data may be packetized for transmission or storage. The video data may be assembled into a video file conforming to any of a variety of standards, such as the International Organization for Standardization (ISO) base media file format and extensions thereof, such as ITU-T H.264/AVC. Such packetized video data may be transported in a variety of ways, such as transmission over a computer network using network streaming.

In the mid 2000's, the growth of video and audio traffic over the Internet Real-time Transport Protocol (RTP) began to flood the internet with a great deal of network traffic, and there were no congestion controls for these protocols. This led corporate information technology (IT) administrators to program their firewalls to block RTP packets containing video and audio streams that were choking the gateways at corporations.

The firewalls threatened existence of video and audio streaming services. Therefore, service providers began to provide content over TCP (more specifically, the HTTP port of TCP) virtual circuits. They did this to camouflage their video and audio traffic as useful HTTP traffic. IT firewall administrators could not easily block video and audio over HTTP/TCP, and so, for a while, video and audio over HTTP over TCP flourished.

Initially a "progressive download" method was used for download of most videos. In this mechanism, a single HTTP connection and transfer is used to download the entire video file. The user watches the download occur, and when enough data has been buffered to support the entire stream-viewing experience, either the player or the user hits "PLAY" and video playback commences. This method suffered from problems, however, when the user wanted to watch a video right away, especially on low-capacity links. Another problem was that in a changing wireless environment, adaptive download could suddenly downshift to a snail's pace, causing stalls in the middle of a video.

Work has been underway to implement Adaptive Streaming over HTTP, which attempts to address these problems. Examples of adaptive streaming protocols include Microsoft Smooth Streaming (MSS), Apple HTTP Live Streaming (HLS), Adobe HTTP Dynamic Streaming (AHDS), and the 3GPP Standard, Dynamic Adaptive Streaming over HTTP (DASH). In 2011 the Netflix video streaming service (based upon MSS) consumed 30% of the North American Internet backhaul at peak times, in the evening, delivering video packets to customer homes.

Adaptive streaming methods generally organize video data very much like an HTML web page. For example, in DASH, a "video web page" is defined to reference all of the "fragments" (sub-files) corresponding to the video data. A fragment is typically 2 seconds of real-time video or audio, and it typically begins with an MPEG I-frame (essentially a full JPEG-encoded picture) in the case of video. In DASH a "video web page" is referred to as a "Media Presentation Description" (MPD). An MPD for a 2-hour video might reference 3600 video uniform resource locators (URLs), and 3600 audio URLs, each of which may correspond to 2 seconds of media when played back. And note that 3600 video URLs may be provided for each bit-rate at which the video is encoded.

One improvement of DASH is that the same video may be described at several different bit-rates, and the player can switch bit-rates (for example, every 2 seconds.) An MPD generally describes 3-8 different renderings of the same video, referred to as representations. When the Internet is congested, or during initial startup, or when the terminal is on a low-capacity link, a low bit rate fragment may be fetched. When the Internet is uncongested and the terminal has a high-capacity link, a high bit rate fragment may be fetched.

SUMMARY

In general, this disclosure describes techniques for streaming video data over a network in accordance with a file delivery service. The video data may be formatted according to dynamic adaptive streaming over HTTP (DASH). That is, media content may include a manifest file, such as a media presentation description (MPD) that describes characteristics of one or more representations of the media content. However, rather than awaiting requests for data of the media content, the techniques of this disclosure allow data to be broadcast (or multicast) to one or more client devices over a file delivery protocol. For example, the data may be broadcast (or multicast) using the File Delivery over Unidirectional Transport (FLUTE) protocol. In some examples, a client device may retrieve some of the media data using a unicast protocol, until a switch point (that is, a random access point) in the data being broadcast has been received. Using the techniques of DASH and a file delivery service such as FLUTE in this manner may improve real time streaming of video data over a broadcast or multicast protocol.

In one example, a method includes retrieving a first portion of media content in accordance with a unicast protocol, wherein the media content conforms to an adaptive video streaming network protocol, and retrieving a second portion of the media content in accordance with a multicast protocol via a file delivery service, wherein the first portion and the second portion are temporally consecutive in the media content.

In another example, a device includes one or more processors configured to retrieve a first portion of media content in accordance with a unicast protocol, wherein the media content conforms to an adaptive video streaming network protocol, and retrieve a second portion of the media content in accordance with a multicast protocol via a file delivery service, wherein the first portion and the second portion are temporally consecutive in the media content.

In another example, a device includes means for retrieving a first portion of media content in accordance with a unicast protocol, wherein the media content conforms to an adaptive video streaming network protocol, and means for retrieving a second portion of the media content in accordance with a multicast protocol via a file delivery service, wherein the first portion and the second portion are temporally consecutive in the media content.

In another example, a computer-readable storage medium has stored thereon instructions that, when executed, cause one or more processors to retrieve a first portion of media content in accordance with a unicast protocol, wherein the media content conforms to an adaptive video streaming network protocol, and retrieve a second portion of the media content in accordance with a multicast protocol via a file delivery service, wherein the first portion and the second portion are temporally consecutive in the media content.

In another example, a method includes obtaining media content conforming to an adaptive video streaming network protocol, outputting a first portion of the media content in accordance with a unicast protocol, and outputting a second portion of the media content in accordance with a file delivery service, wherein the first portion and the second portion are temporally consecutive in the media content.

In another example, a device includes one or more processors configured to obtain media content conforming to an adaptive video streaming network protocol, output a first portion of the media content in accordance with a unicast protocol, and output a second portion of the media content in accordance with a file delivery service, wherein the first portion and the second portion are temporally consecutive in the media content.

In another example, a device includes means for obtaining media content conforming to an adaptive video streaming network protocol, means for outputting a first portion of the media content in accordance with a unicast protocol, and means for outputting a second portion of the media content in accordance with a file delivery service, wherein the first portion and the second portion are temporally consecutive in the media content.

In another example, a computer-readable storage medium has stored thereon instructions that, when executed, cause one or more processors to obtain media content conforming to an adaptive video streaming network protocol, output a first portion of the media content in accordance with a unicast protocol, and output a second portion of the media content in accordance with a file delivery service, wherein the first portion and the second portion are temporally consecutive in the media content.

The details of one or more examples are set forth in the accompanying drawings and the description below. Other features, objects, and advantages will be apparent from the description and drawings, and from the claims.

BRIEF DESCRIPTION OF DRAWINGS

FIG. 7 is a block diagram illustrating examples of network stacks for unicast and multicast.

DETAILED DESCRIPTION

Figure 1:
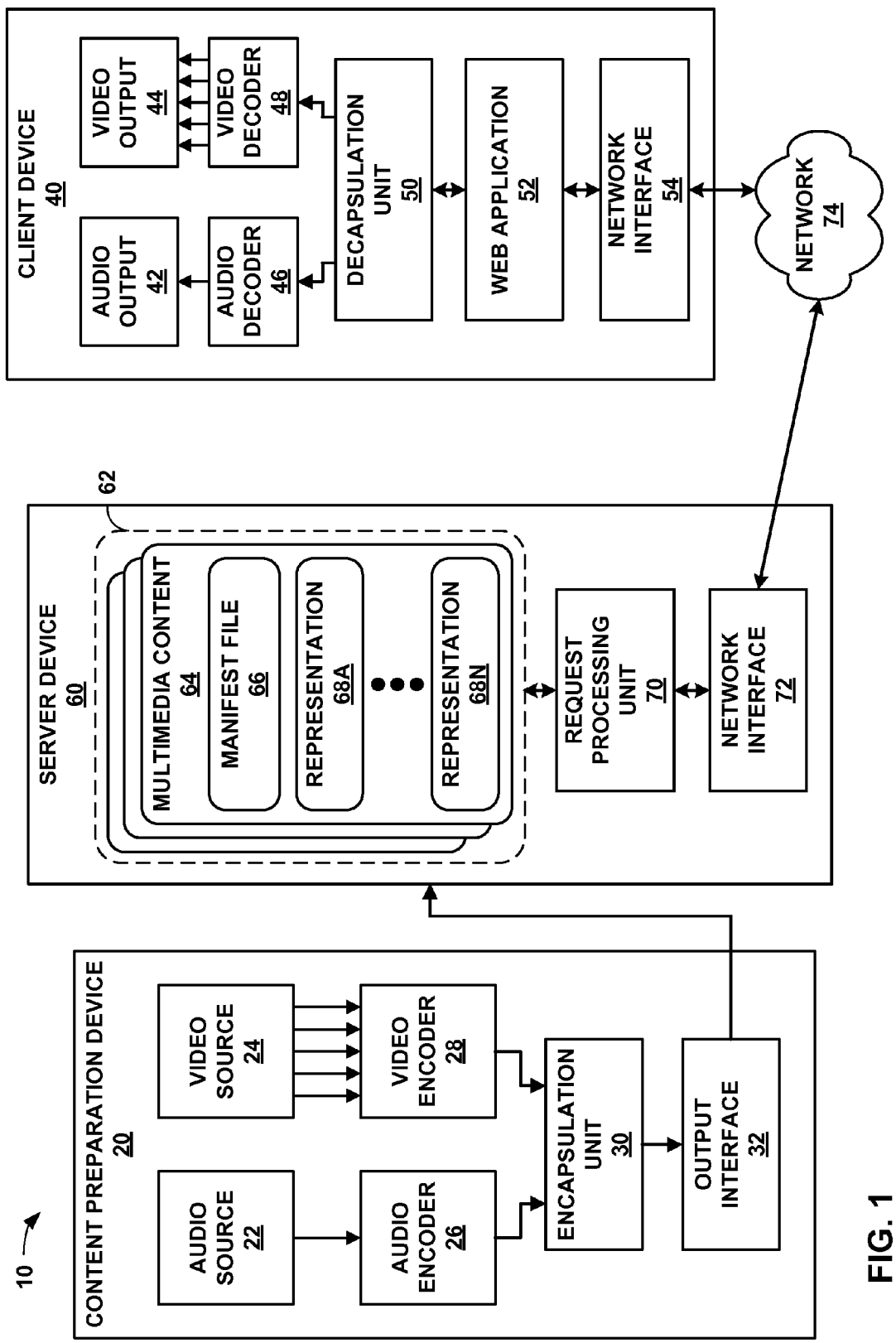
FIG. 1 is a block diagram illustrating an example system that implements techniques for streaming media data over a network.

In general, this disclosure describes techniques related to streaming of multimedia data, such as audio and video data, over a network. The techniques of this disclosure may be used in conjunction with dynamic adaptive streaming over HTTP (DASH). As discussed in greater detail below, certain examples of the techniques of this disclosure include streaming video data, which has been encapsulated according to DASH, using a multicast or broadcast protocol over a file delivery service, such as the File Delivery over Unidirectional Transport (FLUTE) protocol. FLUTE builds on the asynchronous layered coding (ALC) protocol, which provides reliable transport, and thus, FLUTE may also be referred to as FLUTE/ALC. This disclosure describes various techniques that may be performed in conjunction with network streaming, any or all of which may be implemented alone or in any various combinations. As described in greater detail below, various devices performing network streaming may be configured to implement the techniques of this disclosure.

Additional file delivery protocols, which may be used in place of FLUTE as described in this disclosure, include FCAST and raw ALC/LCT (e.g., using ALC and LCT headers to deliver file attributes such a file type, encoding, and compression attributes. FCAST is described in Roca, "FCAST: Scalable Object Delivery for the ALC and NORM protocols," IETF RMT Working Group, October 2011. ALC is described in Luby et al., "Asynchronous Layered Coding (ALC) Protocol Instantiation," RFC 5775, April 2010. LCT is described in Luby et al, "Layered Coding Transport (LCT) Building Block," RFC 5651, October 2009. Other protocols for large-scale file broadcast download include the IEEE 802.1E System Load Protocol which broadcasts files at the MAC layer. The System Load Protocol is described in Luby et al, "BROADCAST MULTIMEDIA STORAGE AND ACCESS USING PAGE MAPS WHEN ASYMMETRIC MEMORY IS USED," U.S. patent Ser. No. 13/206,418, filed Aug. 9, 2011.

In IP-based mobile broadcast TV systems (such as DVB-H, ATSC-M/H, 3GPP MBMS (multimedia broadcast multicast services), 3GPP2 BCMCS (broadcast and multicast service)), streaming and file delivery services (sometimes also referred as Real Time (RT) and Non Real Time (NRT) services, respectively), are delivered using different transport protocols. Streaming services delivery employs RTP (in accordance with RFC 3550), whereas file delivery services (also called download delivery services in some systems) include FLUTE/ALC (in accordance with RFC 3926 and RFC 5775, respectively). Unicast-based adaptive HTTP streaming services are currently the dominant technology in the Internet for video delivery, and is being standardized in 3GPP [TS 26.247] and MPEG [ISO/IEC FCD 23001-6], generally referred to as DASH (Dynamic Adaptive Streaming over HTTP).

However, the techniques of this disclosure may provide certain advantages for emerging mobile broadcast systems such as enhanced Multimedia Broadcast Multicast Service (eMBMS), which is based on LTE technology. In particular, in accordance with the techniques of this disclosure, it is not necessary to deploy separate streaming and file delivery mechanisms, because streaming delivery of video data over a network may be performed over a file delivery service, such as FLUTE. Maintaining seamless service continuity from broadcast to unicast delivery of streaming services is an important capability to mobile operators. For this, not having to employ RTP for supporting unicast streaming is highly desirable, especially given the widespread and growing use of HTTP streaming and the affiliated ecosystem. The ecosystem includes content providers supporting HTTP streaming delivery, Content Delivery Networks (CDNs) and associated HTTP delivery infrastructure such as edge servers and caches, and HTTP streaming technology vendors.

Accordingly, in some examples, this disclosure provides techniques to replace utilize a file delivery service, such as the FLUTE protocol, for broadcast streaming delivery. The file delivery service may operate over a broadcast media access control (MAC) protocol, such as eMBMS, or a multicast protocol such as IP Multicast. This may improve simplicity at both the network and user device sides, in that these techniques may employ a single application transport protocol (e.g., FLUTE) for carrying both streaming and file contents. Furthermore, by employing DASH as the continuous media "file" structure to carry streaming contents in FLUTE/ALC packets, service continuity from broadcast to unicast delivery would simply involve a switch from transporting DASH segments over FLUTE/broadcast to HTTP/unicast. As a consequence, RTP-based unicast streaming solutions, such as 3GPP's PSS (Packet-switched Streaming Service) (described in TS 26.234) becomes no longer necessary, allowing the service provider/network operator to take advantage of the emerging popularity of HTTP streaming for unicast delivery of media contents.

In particular, to stream video data over a file delivery service, such as the FLUTE protocol, a client device may pre-populate a cache with data received via the file delivery service. As explained in greater detail below, the client device may be configured to determine whether requested data is present in a local memory prior to requesting the data via unicast. Rather than populating the cache only after receiving data via unicast, the techniques of this disclosure include receiving data via broadcast or multicast in accordance with a file delivery service, such as the FLUTE protocol, and pre-populating the cache with the data received via broadcast or multicast. In this manner, the client device may determine that the data is cached without having received the data via unicast. With the proper cache management software, this allows seamless handover between broadcast and unicast transmission, and vice-versa. This simplified handoff technique has not been realized in any previous streaming protocols before.

This disclosure further provides, in some examples, techniques to reduce start-up and channel changing times when using FLUTE delivery of broadcast streaming services due to nominal Application Level FEC processes, which might otherwise incur significant playout delay. Furthermore, in some examples, this disclosure provides techniques to cache downloaded media contents for potential future use, for example when the same content is desired for fetching using unicast delivery, assuming that a client device includes an adequate amount of inexpensive non-volatile local storage, such as FLASH memory.

This disclosure describes various techniques, which may be used in any combination. As one example, this disclosure describes techniques for simplifying broadcast content delivery. In these techniques, the FLUTE protocol may be used for delivering streaming media content. It is assumed that media contents are nominally encapsulated in the ISO Base Media File Format (in accordance with ISO/IEC 14496-12), especially in the form of DASH segments (e.g., in accordance with TS 27.247), and accompanied by associated manifest information given by the DASH Media Presentation Description (MPD). Temporal semantics for ensuring correct media stream playout may be provided by metadata contained within the DASH segment format, along with wall clock time indicators contained in the MPD. In combination, these offer functionality similar to RTP (sequence number, timestamp and actual wall-clock time via RTCP Sender Reports), without requiring the additional packet encapsulation process of RTP. A protocol model diagram showing the replacement for the use of RTP by FLUTE for carrying streaming media contents is shown in FIG. 7, which is described in greater detail below.

As another example, this disclosure describes techniques for leveraging temporary use of unicast HTTP streaming to reduce playout latency. Unicast HTTP streaming can be temporarily used in lieu of FLUTE broadcast to reduce playout latency seen by the end user during start-up (initial "tune-in" to selected content), as well as during channel changes (a.k.a., 'zapping'). These techniques may be important to service providers and end users for improved usage experience and overall quality of service. It is assumed that a relatively long, for example, 20-30 sec end-to-end latency (defined as the interval between a live event's actual start time to when it is presented on the user device screen) is acceptable to the service provider. Such delay allows desired time diversity for effective operation of Application Level FEC (AL FEC), such as Raptor code (in accordance with RFC 5053).

For nominal broadcast delivery, some examples assume 10-second-long DASH segments (of $SegType_{10s}$) are delivered over broadcast/FLUTE. During start-up, that is, when a user selects (using a client device) a desired live program to view (perhaps using service announcement information contained in an Electronic Service Guide), directly delivering the broadcast DASH segments would lead to approximately 10-sec+ delay before content can be FEC decoded and played out onto the screen. To reduce the start-up delay, the client device could operate in unicast HTTP streaming mode, whereby the DASH segments are relatively short, on the order of 1-2 sec in duration, in accordance with some examples of the techniques of this disclosure.

Assuming 1-sec long DASH segments (call these $SegType_{1s}$) are delivered over unicast/HTTP during program start-up, when the user selects the program, the client device first operates in unicast HTTP streaming mode, fetching the first 10 segments of $SegType_{1s}$ via unicast, and delivers those to the media player for rendering. In the meantime, the FLUTE client (also executing on the client device) downloads the 2nd $SegType_{10}$ (not the 1st, since that is being served by unicast delivery). The client device may then switch from unicast to broadcast reception and playout would following between the tenth $SegType_{1s}$ and the second $SegType_{10s}$, upon which nominal broadcasting of the live event continues, and unicast HTTP streaming can be deactivated. An example of these techniques is described in greater detail with respect to FIG. 6 below.

Figure 10:
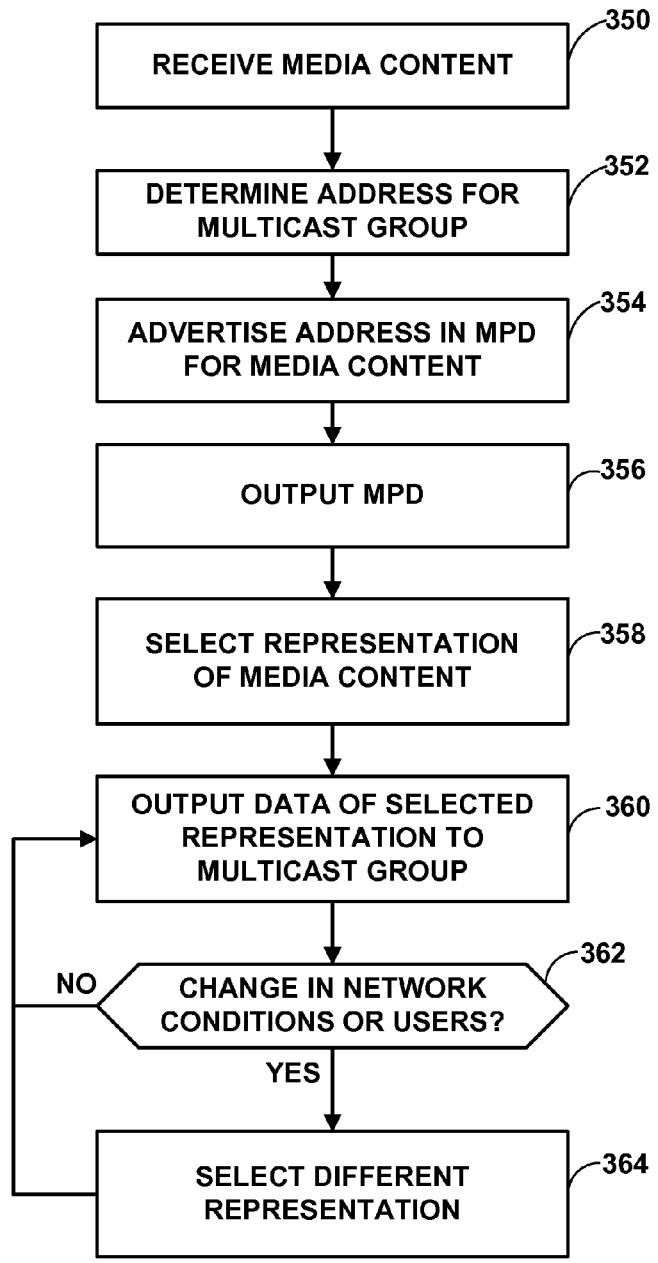
FIG. 10 is a flowchart illustrating an example method for outputting media content using a file delivery service.

A similar operation (initial unicast to steady-state broadcast operation) could be performed by a client device in response to a user performing a channel change. In other words, the 'zapping' delay could be reduced from on the order of 10 sec to 1 sec by employing unicast HTTP streaming delivery of the selected target channel during channel change. FIG. 10, described in greater detail below, describes an example method for performing initial tune-in and/or channel change operations in accordance with the techniques of this disclosure.

As another example, this disclosure describes techniques for caching data received via broadcasted streaming by a client device. As FLUTE-broadcast contents are received by the client device, the client device may continuously deliver and write contents as a single data file in FLASH-based Non-Volatile Memory (NVM), such that a large block of received data may be written to consecutive positions within the data file during each write, and such that the data is written in such a way that each page of FLASH NVM contains data associated with a single sub-block. Furthermore, FIG. 8, as described in greater detail below, shows that cached content, if later selected for access by the end user using HTTP streaming delivery, could be retrieved and decoded and provided to the HTTP Streaming client to avoid unnecessary content acquisition via the unicast network. Details of storing and retrieving data from flash memory are described in Luby et al., "BROADCAST MULTIMEDIA STORAGE AND ACCESS USING PAGE MAPS WHEN ASYMMETRIC MEMORY IS USED," U.S. patent Ser. No. 13/206,418, filed Aug. 9, 2011.

The techniques of this disclosure, in some examples, may provide one or more advantages. For example, these techniques may allow server devices and client devices to support fewer delivery methods. That is, server devices and client devices may be configured to deliver video data only according to the FLUTE protocol, rather than implementing both the FLUTE protocol for file delivery and RTP for streaming delivery. Furthermore, these techniques may allow for the elimination of the use of RTP-based unicast streaming implementation to support service continuity or handoff from broadcast to unicast delivery. For example, 3GPP MBMS defines the use of PSS to support MBMS streaming service delivery on unicast. RTP may be totally replaced by unicast HTTP streaming, when unicast is desired, e.g., in the Internet for Over-the-Top video delivery. In this case, handoff would be accomplished by the browser itself, when it asks for a video segment (and the FLUTE or broadcast download protocol can no longer populate the cache), which would result in a "cache miss", and would invoke HTTP to fetch the missing video segment.

In accordance with DASH and similar techniques for streaming data over a network, multimedia content (such as a movie or other media content, which may also include audio data, video data, text overlays, or other data) may be encoded in a variety of ways and with a variety of characteristics. A content preparation device may form multiple representations of the same multimedia content. Each representation may correspond to a particular set of characteristics, such as coding and rendering characteristics, to provide data usable by a variety of different client devices with various coding and rendering capabilities. Moreover, representations having various bitrates may allow for bandwidth adaptation. That is, a client device may determine an amount of bandwidth that is currently available and select a representation based on the amount of available bandwidth, along with coding and rendering capabilities of the client device.

In some examples, a content preparation device may indicate that a set of representations has a set of common characteristics. The content preparation device may then indicate that the representations in the set form an adaptation set, such that representations in the adaptation set can be used for bandwidth adaptation. That is, representations in the set may differ in bitrate, but otherwise share substantially the same characteristics. In this manner, a client device may determine various sets of common characteristics for adaptation sets of multimedia content, and select an adaptation set based on coding and rendering capabilities of the client device. Then, the client device may adaptively switch between representations in the selected adaptation set based on bandwidth availability. Alternatively, in accordance with the techniques of this disclosure, a client device may request data from one of the representations during unicast, then switch to a different representation for broadcast.

Moreover, a server device providing the broadcast may perform server-side bandwidth adaptation by switching between representations in response to bandwidth availability changes in the network. For example, the server device may receive information indicating the number of viewers that are receiving a broadcast or multicast of media content. Some broadcast systems such as eMBMS have signaling to count the number of viewers for each broadcast presentation. As the number of viewers increases, the server device may determine that so many viewers are watching the content, that more bandwidth can be dedicated to the video (because fewer users in the sector are likely to do other activities in the sector.) In this case, the service provider may upgrade the video quality to give more satisfaction to the many viewers of a very popular media broadcast. Similarly, if the broadcast system determines that many people have stopped viewing a media broadcast, the system may downgrade the video quality and bitrate to give more satisfaction to unicast users in that sector.

Data for the representations may be separated into individual files. Each of the files may be addressable by a particular uniform resource locator (URL) or uniform resource identifier (URI). A client device may submit an HTTP GET request for a file at a particular URL to retrieve the file using unicast. Alternatively or additionally, the client device may subscribe to a broadcast or multicast network group to retrieve data of a corresponding broadcast or multicast. For example, the client device may request a series of files from one representation using HTTP GET requests to perform unicast retrieval, while simultaneously or subsequently subscribing to a broadcast or multicast group to retrieve files from a different representation. The client device may retrieve files using unicast corresponding to a temporal location that is contiguous but preceding a temporal location of the broadcast or multicast to allow for seamless playout of media data. That is, the client device may seamlessly switch from the unicast data to the broadcast or multicast data during playout.

Video files, such as segments of representations of media content, may conform to video data encapsulated according to any of the: ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats. For purposes of explanation and example, the ISO Base Media File Format is described below, but it should be understood that files conforming to other formats may also be used to perform the techniques of this disclosure.

The ISO Base Media File Format is designed to contain timed media information for a presentation in a flexible, extensible format that facilitates interchange, management, editing, and presentation of the media. ISO Base Media File format (ISO/IEC 14496-12:2004) is specified in MPEG-4 Part-12, which defines a general structure for time-based media files. It is used as the basis for other file formats in the family such as AVC file format (ISO/IEC 14496-15) defined support for H.264/MPEG-4 AVC video compression, 3GPP file format, SVC file format, and MVC file format. 3GPP file format and MVC file format are extensions of the AVC file format. ISO base media file format contains the timing, structure, and media information for timed sequences of media data, such as audio-visual presentations. The file structure may be object-oriented. A file can be decomposed into basic objects very simply and the structure of the objects is implied from their type.

Files conforming to the ISO base media file format (and extensions thereof) may be formed as a series of objects, called "boxes", object-oriented building blocks defined by a unique type identifier and length Data in the ISO base media file format may be contained in boxes, such that no other data needs to be contained within the file and there need not be data outside of boxes within the file. This includes any initial signature required by the specific file format. Typically, a presentation is contained in one file, and the media presentation is self-contained. The movie container (movie box) may contain the metadata of the media and the video and audio frames may be contained in the media data container and could be in other files.

A representation (motion sequence) may be contained in several files, also referred to as segments in DASH. Timing and framing (position and size) information is generally in the ISO base media file and the ancillary files may essentially use any format. This representation may be 'local' to the system containing the representation, or may be provided via a network or other stream delivery mechanism.

In HTTP streaming, a media presentation may be a structured collection of data that is accessible to the client. The client may request and download media data information to present a streaming service to a user. In unicast streaming delivery using HTTP, frequently used operations include GET and partial GET. The GET operation retrieves a whole file associated with a given uniform resource locator (URL). The partial GET operation includes a byte range as an input parameter and retrieves a continuous number of bytes of a file corresponding to the specified byte range. Thus, movie fragments may be provided for HTTP streaming, because a partial GET operation can retrieve one or more individual movie fragments. Note that, in a movie fragment, there can be several track fragments of different tracks.

In the example of DASH, there may be multiple representations for video and/or audio data of multimedia content (also referred to as media content). The manifest of such representations is defined in a Media Presentation Description (MPD) data structure. A media presentation may correspond to a structured collection of data that is accessible to an HTTP streaming client device. The HTTP streaming client device may request and download media data information to present a streaming service to a user of the client device. The MPD data structure describes coding and rendering characteristics of each representation of the media content. In addition, in accordance with the techniques of this disclosure, a server device may provide data that describes characteristics of a broadcast or a multicast, e.g., to provide sufficient information for a client device to receive the broadcast or multicast. For example, the data may include a multicast address that client devices may use to join the multicast.

A media presentation may contain a sequence of one or more periods. Each period may contain one or more representations for the same media content. A representation may be one of a number of alternative encoded versions of audio or video data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by a group attribute in the MPD (which may identify an adaptation set). Representations in the same group (or adaptation set) are generally considered alternatives to each other. For example, each representation of video data for a particular period may be assigned to the same group, such that any of the representations may be selected for decoding to display video data of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD provides the identifiers for each segment. In some examples, the MPD may also provide byte ranges in the form of a range attribute, which may correspond to the data for a segment within a file accessible by the HTTP URL.

Each representation may also include one or more media components, where each media component may correspond to an encoded version of one individual media type, such as audio, video, or timed text (e.g., for closed captioning). Media components may be time-continuous across boundaries of consecutive media segments within one representation.

Any or all of the techniques of this disclosure may be used in a variety of scenarios. For example, the techniques for switching from unicast to multicast or broadcast may be used to "catch up" to a subsequent switch point (or IDR picture) in the broadcast or multicast, e.g., upon initially starting video streaming or in response to a channel change. These techniques may also be used when a variety of channels are available. For example, a client device may retrieve data corresponding to the first few seconds of a plurality of different media contents via unicast. Then, after a user selects one of the plurality of media contents, the client device may subscribe to the broadcast or multicast of the media content while displaying data for the selected media content received via unicast. In some examples, the client device may present a menu having video clips for each of the plurality of media contents, corresponding to the retrieved unicast data for each of the plurality of media contents, to provide a video-based selection menu for the user.

As another example, these techniques may be applied during a handover or handoff between base stations of a network backhaul. Some base stations may provide multicast or broadcast, while other base stations may only provide unicast. In accordance with the techniques of this disclosure, a client device may determine that a handover or handoff has occurred or is about to occur between base stations, and switch between broadcast and unicast seamlessly in response to this determination. For example, when switching from a base station that provides broadcast or multicast transport to a base station that only provides unicast transport, the client device may begin unicast streaming of media content. As another example, when switching from a base station that only provides unicast transport to a base station that provides broadcast or multicast transport, the client device may begin receiving media data via broadcast or multicast, accordingly.

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device. In some examples, content preparation device 20 may distribute prepared content to a plurality of server devices, including server device 60. Similarly, client device 40 may communicate with a plurality of server devices, including server device 60, in some examples.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured by audio source 22 contemporaneously with video data captured by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

As with many video coding standards, H.264/AVC defines the syntax, semantics, and decoding process for error-free bitstreams, any of which conform to a certain profile or level. H.264/AVC does not specify the encoder, but the encoder is tasked with guaranteeing that the generated bitstreams are standards-compliant for a decoder. In the context of video coding standard, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and macroblock (MB) processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile. Various representations of multimedia content may be provided, to accommodate various profiles and levels of coding within H.264, as well as to accommodate other coding standards, such as the upcoming High Efficiency Video Coding (HEVC) standard.

A decoder conforming to a profile ordinarily supports all the features defined in the profile. For example, as a coding feature, Bidirectional-predictive coding is not supported in the baseline profile of H.264/AVC but is supported in other profiles of H.264/AVC. A decoder conforming to a particular level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define, for example, limitations on the number of blocks that need to be processed, decoded picture buffer (DPB) size, coded picture buffer (CPB) size, vertical motion vector range, maximum number of motion vectors per two consecutive MBs, and whether a Bidirectionally-predicted-block can have sub-block partitions less than 8x8 pixels. In this manner, a decoder may determine whether the decoder is capable of properly decoding the bitstream.

Video compression standards such as ITU-T H.261, H.262, H.263, MPEG-1, MPEG-2, H.264/MPEG-4 part 10, and the upcoming High Efficiency Video Coding (HEVC) standard, make use of motion compensated temporal prediction to reduce temporal redundancy. The encoder, such as video encoder 28, may use a motion compensated prediction from some previously encoded pictures (also referred to herein as frames) to predict the current coded pictures according to motion vectors. There are three major picture types in typical video coding. They are Intra coded picture ("I-pictures" or "I-frames"), Predicted pictures ("P-pictures" or "P-frames") and Bi-directional predicted pictures ("B-pictures" or "B-frames"). P-pictures may use the reference picture before the current picture in temporal order. In a B-picture, each block of the B-picture may be predicted from one or two reference pictures. These reference pictures could be located before or after the current picture in temporal order.

Parameter sets generally contain sequence-layer header information in sequence parameter sets (SPS) and the infrequently changing picture-layer header information in picture parameter sets (PPS). With parameter sets, this infrequently changing information need not be repeated for each sequence or picture; hence, coding efficiency may be improved. Furthermore, the use of parameter sets may enable out-of-band transmission of header information, avoiding the need for redundant transmissions to achieve error resilience. In out-of-band transmission, parameter set network abstraction layer (NAL) units are transmitted on a different channel than the other NAL units.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise a combination of audio data and video data, e.g., one or more audio elementary stream and one or more video elementary streams. Each PES packet may include a stream_id that identifies the elementary stream to which the PES packet belongs. Encapsulation unit 30 is responsible for assembling elementary streams into video files of various representations.

Encapsulation unit 30 receives PES packets for elementary streams of a representation from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block and/or slice level data. Other NAL units may be non-VCL NAL units, such as supplemental enhancement information (SEI) messages.

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media.

In the example of FIG. 1, server device 60 includes storage medium 62 that stores various multimedia contents 64, each including a respective manifest file 66 and one or more representations 68A-68N (representations 68). In accordance with the techniques of this disclosure, portions of manifest file 66 may be stored in separate locations, e.g., locations of storage medium 62 or another storage medium, potentially of another device of network 74 such as a proxy device.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66. In accordance with DASH, as an example, manifest file 66 may comprise an MPD file.

Server device 60 includes request processing unit 70 and network interface 72. In some examples, server device 60 may include a plurality of network interfaces, including network interface 72. Furthermore, any or all of the features of server device 60 may be implemented on other devices of a content distribution network, such as routers, bridges, proxy devices, switches, or other devices. In some examples, intermediate devices of a content distribution network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 72. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment. In some examples, byte ranges of a segment may be specified using partial GET requests.

Request processing unit 70 may further be configured to service HTTP HEAD requests to provide header data of a segment of one of representations 68. In any case, request processing unit 70 may be configured to process the requests to provide requested data to a requesting device, such as client device 40.

In accordance with the techniques of this disclosure, server device 60 may also act as a broadcast or multicast server. Alternatively, a separate device may act as a broadcast or multicast server, e.g., as described with respect to FIG. 3 below. In any case, a server device, such as server device 60, may implement one or more broadcast or multicast protocols to broadcast or multicast data of one or more representations.

For example, client device 40 may join a multicast group, and server device 60 may send data of one of representations 68 to the multicast group. A network device, such as a router, of network 74 may redirect data sent to the multicast group to devices that have subscribed to the multicast group. Thus, when client device 40 joins a multicast group, and server device 60 sends data of one of representations 68 to the multicast group (e.g., by addressing the data to an IP address of the multicast group), routers of network 74 may replicate the data for members of the multicast group that lie along separate network routes, ultimately reaching client device 40.

Server device 60, client device 40, and devices of network 74 (such as routers) may implement the Internet Group Management Protocol (IGMP) as described in, e.g., Cain et al., "Internet Group Management Protocol, Version 3," Internet Engineering Task Force, Network Working Group, RFC 3376, October 2002, to perform multicast over IPv4 networks, and/or Multicast Listener Discovery (MLD) as described in, e.g., Vida et al., "Multicast Listener Discovery Version 2 (MLDv2) for IPv6," Internet Engineering Task Force, Network Working Group, RFC 2710, October 1999, to perform multicast over IPv6 networks. Additional details of multicast using IGMP and MLD are described in Holbrook et al., "Using Internet Group Management Protocol Version 3 (IGMPv3) and Multicast Listener Discovery Protocol Version 2 (MLDv2) for Source-Specific Multicast," Internet Engineering Task Force, Network Working Group, RFC 4604, August 2006.

As another example, server device 60, or a separate server device, may send data of one of representations 68 to a broadcast domain, such that all members of the broadcast domain (e.g., client device 40) receive the broadcast data. Routers within network 74 may divide network 74 into broadcast domains. In some examples, server device 60 may provide a virtual local area network (VLAN), and client devices such as client device 40 may join the VLAN in order to receive the network broadcast data.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

Web application 52 of client device 40 may comprise a web browser executed by a hardware-based processing unit of client device 40, or a plug-in to such a web browser. References to web application 52 should generally be understood to include either a web application, such as a web browser, a standalone video player, or a web browser incorporating a playback plug-in to the web browser. Web application 52 may retrieve configuration data (not shown) of client device 40 to determine decoding capabilities of video decoder 48 and rendering capabilities of video output 44 of client device 40.

The configuration data may also include any or all of a language preference selected by a user of client device 40, one or more camera perspectives corresponding to depth preferences set by the user of client device 40, and/or a rating preference selected by the user of client device 40. Web application 52 may comprise, for example, a web browser or a media client configured to submit HTTP GET and partial GET requests, as well as to request to receive broadcast or multicast data. Web application 52 may correspond to software instructions executed by one or more processors or processing units (not shown) of client device 40. In some examples, all or portions of the functionality described with respect to web application 52 may be implemented in hardware, or a combination of hardware, software, and/or firmware, where requisite hardware may be provided to execute instructions for software or firmware.

Web application 52 may compare the decoding and rendering capabilities of client device 40 to characteristics of representations 68 indicated by information of manifest file 66. Web application 52 may initially retrieve at least a portion of manifest file 66 to determine characteristics of representations 68. For example, web application 52 may request a portion of manifest file 66 that describes characteristics of one or more adaptation sets. Web application 52 may select a subset of representations 68 (e.g., an adaptation set) having characteristics that can be satisfied by the coding and rendering capabilities of client device 40. Web application 52 may then determine bitrates for representations in the adaptation set, determine a currently available amount of network bandwidth, and retrieve segments (or byte ranges) from one of the representations having a bitrate that can be satisfied by the network bandwidth.

In accordance with the techniques of this disclosure, web application 52 may be configured to request to receive broadcast or multicast data sent by server device 60 (or another server device). For example, web application 52 may be configured to initially retrieve data for manifest file 66, which may include data for joining a multicast group (such as a multicast group IP address) or for receiving a broadcast (e.g., data for joining a broadcast domain or VLAN). Moreover, web application 52, or another application or system software of client device 40, may be configured to implement a file delivery protocol, such as the FLUTE protocol. In this manner, client device 40 may be configured to retrieve data of multimedia content 64 using broadcast or multicast via the FLUTE protocol. To utilize FLUTE as a file delivery service, server device 60 may provide a File Delivery Table (FDT)

including attributes indicating one or more unicast uniform resource locators (URLs) for media content 62 to client device 40.

In accordance with the techniques of this disclosure, different ones of representations 68 may have different temporal frequencies of switch points (also referred to as random access points (RAPs), which may include instantaneous decoder refresh (IDR), open decoder refresh (ODR), and/or clean random access (CRA) pictures). For example, representation 68A may include switch points that occur at approximately one second intervals, in terms of playback time, while representation 68N may include switch points that occur at approximate ten second intervals, again in terms of playback time. Server device 60 may broadcast data from one of representations 68 having a relatively low frequency of switch points, e.g., ten seconds in terms of playback time.

In accordance with the techniques of this disclosure, client device 40 may request data from one of representations 68 having a higher frequency of switch points until a sufficient amount of data is buffered, then switch to the broadcast or multicast. Although the data of the representation having a higher frequency of switch points may have a relatively lower quality, the user experience may be improved by seeing at least some video data, even if relatively lower quality, rather than seeing a blank screen while client device 40 waits for a switch point of a relatively higher quality representation to arrive. Of course, after receiving a switch point of the relatively higher quality representation (which may be received via broadcast or multicast in accordance with the FLUTE protocol), client device 40 may switch to that representation.

At times, a user of client device 40 may interact with web application 52 using user interfaces of client device 40, such as a keyboard, mouse, stylus, touchscreen interface, buttons, or other interfaces, to request multimedia content, such as multimedia content 64. In response to such requests from a user, web application 52 may select one of representations 68 based on, e.g., decoding and rendering capabilities of client device 40. To retrieve data of the selected one of representations 68, web application 52 may sequentially request specific byte ranges of the selected one of representations 68. In this manner, rather than receiving a full file through one request, web application 52 may sequentially receive portions of a file through multiple requests.

As noted above, representations 68 may include video data of various coding and rendering characteristics. Representations of an adaptation set may have varying bitrates, which may allow for bandwidth adaptation. In conventional DASH techniques, this allows a client device to adapt to changing bandwidth availability by retrieving data from a representation having a bitrate that can be best accommodated by the current amount of available bandwidth. In accordance with the techniques of this disclosure, server device 60 may be configured to perform bandwidth adaptation. For example, server device 60 may receive information indicating a current amount of network bandwidth, and select one of representations 68 accordingly. Thus, if available bandwidth increases, server device 60 may begin broadcasting or multicasting data of one of representations 68 having a relatively higher bitrate, whereas if available bandwidth decreases, server device 60 may begin broadcasting or multicasting data of one of representations 68 having a relatively lower bitrate.

Network interface 54 may receive data, whether by broadcast, multicast, or unicast, sent from server device 60 (or another server device). In particular, network interface 54 may receive and provide data of received segments of representations 68 to web application 52. Web application 52 may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Moreover, in accordance with the techniques of this disclosure, web application 52 may cache data received according to multicast or broadcast via FLUTE, e.g., in flash memory (not shown) of client device 40. Client device 40 may include one or more computer-readable storage media, such as flash memory, for storing data received via broadcast or multicast for a period of time. In this manner, a user may initially request to view data being broadcast or multicast by server device 60 (or another server device). Client device 40 may then cache the received data. Thus, if a user subsequently requests to view the data, client device 40 may retrieve the data from the storage media, e.g., the flash memory, internal to client device 40, rather than requesting to retrieve the data again.

Server device 60 may provide caching primitives when broadcasting or multicasting video data via the FLUTE protocol. The caching primitives may comprise values indicating one or more of a length of time to store the data, an indication of when the data will expire (e.g., an "expires" primitive), a creation date of the data, a transmission date of the data, an entity tag (ETag) that identifies a specific version of the media content, a Cache-Control header that indicates that data of the media content is cacheable, or other such information. Thus, client device 40 may use the caching primitives to determine how, and for how long, to cache the data. Likewise, intermediate network devices of network 74, such as routers, proxy devices, caching devices, or other such network devices, may also use the caching primitives to cache the data. Thus, if a client device were to request the data, e.g., using unicast, the intermediate network devices that cached the data could deliver the data to the client device, rather than forwarding the request to server device 60.

Video encoder 28, video decoder 48, audio encoder 26, audio decoder 46, encapsulation unit 30, web application 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder audio encoder 26, audio decoder 46, encapsulation unit 30, web application 52, and/or decapsulation unit 50 may comprise an integrated circuit, a microprocessor, and/or a wireless communication device, such as a cellular telephone.

Figure 2:
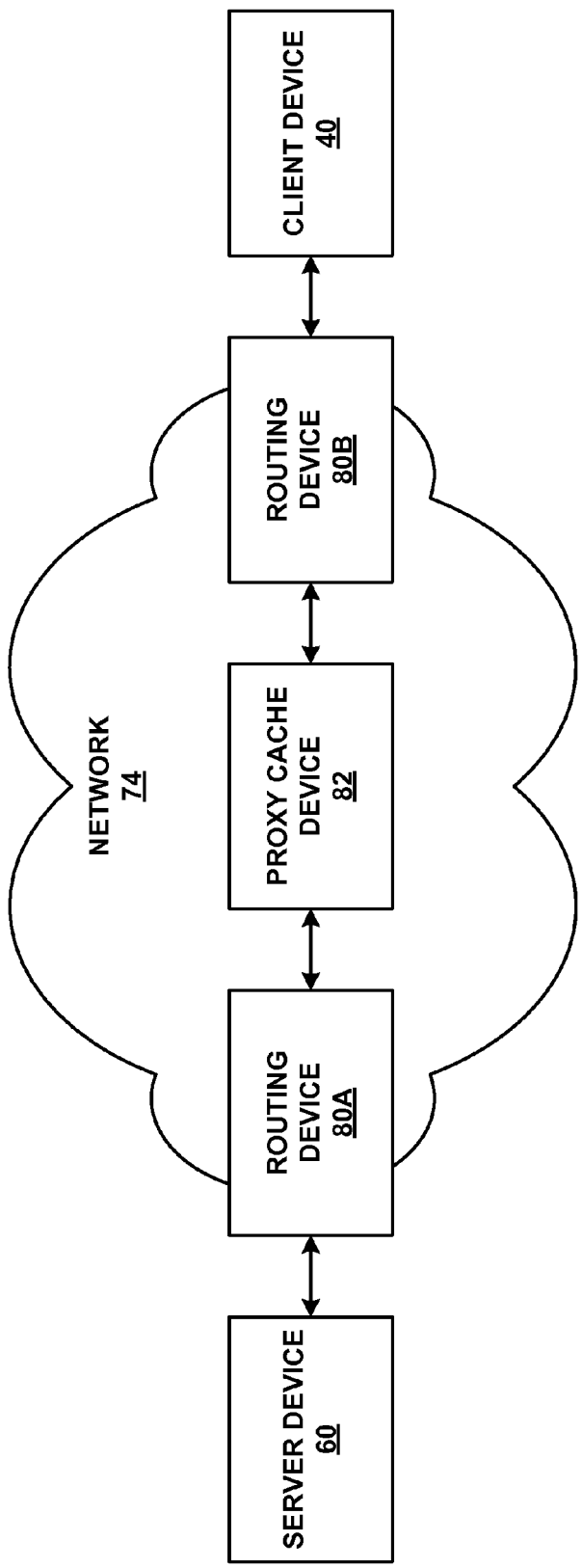
FIG. 2 is a block diagram illustrating an example set of devices that form part of the network of FIG. 1.

FIG. 2 is a block diagram illustrating an example set of devices that form part of network 74 of FIG. 1. In this example, network 74 includes routing devices 80A, 80B (routing devices 80) and proxy cache device 82. Routing devices 80 and proxy cache device 82 are intended to represent a small number of devices that may form part of network 74. Other network devices, such as switches, hubs, gateways, firewalls, bridges, and other such devices may also be included within network 74. Moreover, additional network devices may be provided along a network path between server device 60 and client device 40.

In general, routing devices 80 implement one or more routing protocols to exchange network data through network 74. In some examples, routing devices 80 may be configured to perform proxy or cache operations, such as the functionality attributed to proxy cache device 82 as described below. Therefore, in some examples, routing devices 80 may be referred to as proxy devices as well. In general, routing devices 80 execute routing protocols to discover routes through network 74. By executing such routing protocols, routing device 80B may discover a network route from itself to server device 60 via routing device 80A.

Accordingly, routing device 80B may receive network communications, such as TCP-IP encapsulated HTTP GET requests, from client device 40, destined for server device 60. In response to such communications, routing device 80B may determine a route to server device 60, and further, determine that the route includes proxy cache device 82. For example, proxy cache device 82 may comprise a "next hop" along the route, or one or more additional network devices may communicatively couple routing device 80B to proxy cache device 82. Proxy cache device 82 may also direct the communication to routing device 80A, which may forward the communication to server device 60.

Proxy cache device 82 may perform proxy caching functions. HTTP proxy caching is important for the Internet to operate. HTTP proxy cache devices, such as proxy cache device 82, may implement any or all HTTP protocol versions (e.g., HTTP 0.9, HTTP 1.0, and/or HTTP 1.1). In accordance with the techniques of this disclosure, proxy cache device 82 may cache data of media content received via unicast, broadcast, or multicast. For example, proxy cache device 82 may be configured to cache data exchanged in accordance with the FLUTE protocol. In this manner, proxy cache device 82 may cache both unicast data exchanged according to HTTP and multicast or broadcast data exchanged according to FLUTE.

Moreover, in accordance with the techniques of this disclosure, routing devices, such as routing device 80B, may be configured to accept requests by client devices, such as client device 40, to receive multicast or broadcast data. For example, routing device 80B may be configured to receive IGMP join requests for a multicast group from client devices, such as client device 40. Routing device 80B may also be configured to receive data of the multicast group from server device 60. In response to receiving such data, routing device 80B may copy and forward the received data to each client device that has requested to join the multicast group. Thus, assuming additional client devices are (directly or indirectly) communicatively coupled to routing device 80B, routing device 80B would copy and forward the multicast data to each of the client devices that have joined the corresponding multicast group. Routing device 80A may also be configured similarly to routing device 80B, e.g., to implement IGMP for multicast support. Furthermore, other client devices may be communicatively coupled (directly or indirectly) to routing device 80A.

Figure 3:
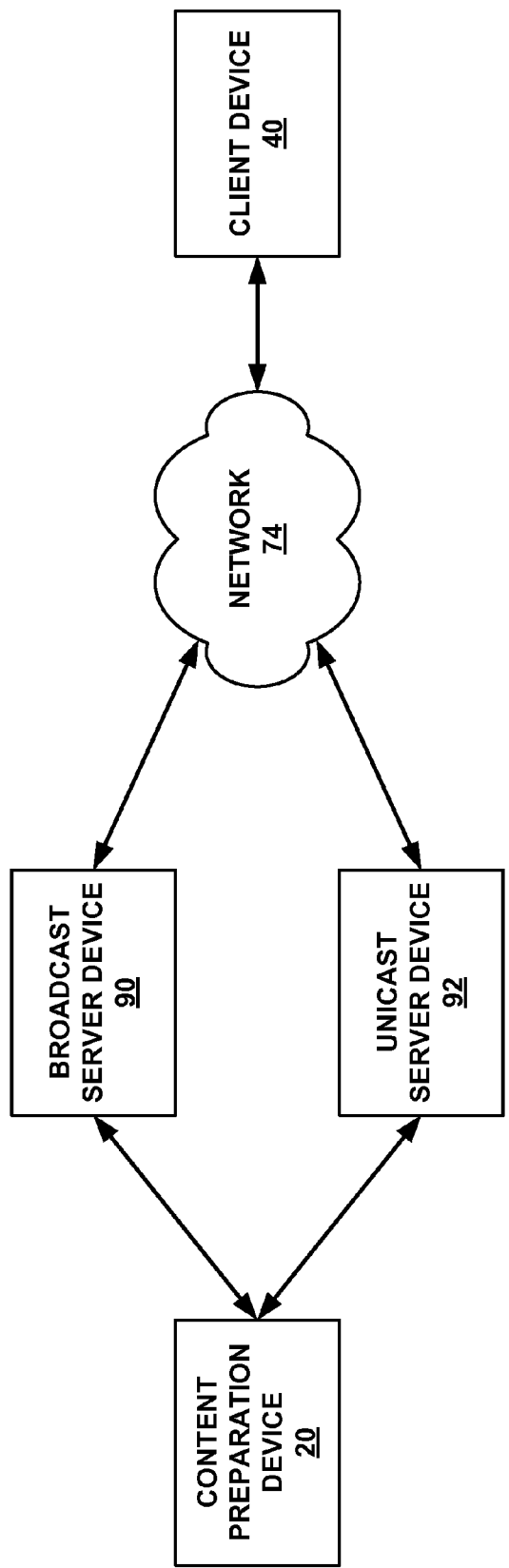
FIG. 3 is a block diagram illustrating an example in which two server devices provide data of media content to a client device.

FIG. 3 is a block diagram illustrating an example in which two server devices provide data of media content to client device 40. In particular, the example of FIG. 3 illustrates broadcast server device 90 and unicast server device 92. In some examples, broadcast server device 90 and unicast server device 92 form part of the same content delivery network. Both broadcast server device 90 and unicast server device 92 may be configured similarly to server device 60 of FIGS. 1 and 2. Alternatively, broadcast server device 90 may be configured only to output media data in the form of a network broadcast or multicast, while unicast server device 92 may be configured only to output media data in the form of unicast, e.g., in response to requests from client device 40.

In the example of FIG. 3, both broadcast server device 90 and unicast server device 92 receive media data from content preparation device 20. Broadcast server device 90 and unicast server device 92 may receive the same media data, or different representations of the media data. Although referred to as a broadcast server device, broadcast server device 90 may, additionally or alternatively, be configured to output data in accordance with multicast. Furthermore, broadcast server device 90 may be configured to multicast or broadcast media data in accordance with the FLUTE protocol.

In accordance with the techniques of this disclosure, client device 40 may access a web page or other network location to retrieve an MPD file (e.g., a file corresponding to manifest file 66 of FIG. 1). The web page may be hosted by unicast server device 92. The client device may extract information from the MPD to retrieve data of media content from unicast server device 92 and/or to receive data of the media content from broadcast server device 90. For example, the MPD may include a multicast group address for a multicast group served by broadcast server device 90. The MPD may also include URLs for accessing data of representations of the media content hosted by unicast server device 92 in accordance with unicast. Moreover, the MPD may describe coding and rendering characteristics of the representations of the media content. In some examples, the MPD may provide information indicating adaptation sets for broadcast or multicast and for unicast. That is, the MPD may indicate whether representations of an adaptation set are available for broadcast or multicast, unicast, or both.

Furthermore, the MPD may provide information indicating timing information for the representations of the media content. In some examples, broadcast or multicast representations, provided by broadcast server device 90, have less frequent switch points than other representations, provided by unicast server device 92. In such examples, client device 40 may determine an amount of data corresponding to a period of time between switch points (in terms of playback time), and request to retrieve that amount of data from unicast server device 92. Client device 40 may buffer this data, received from unicast server device 92, before or while also beginning to receive data of the broadcast or multicast from broadcast server device 90. In this manner, client device 40 may buffer a sufficient amount of data, received via unicast, to begin decoding and playing out data of the media content until a switch point of a representation received via multicast or broadcast has been received. The client device may begin decoding the representation received via multicast or broadcast at the switch point, and may further stop requesting data via unicast for the media data after switching to this representation.

Again, it should be understood that in some examples, the same server device may output data both using unicast (in response to HTTP GET or partial GET requests) and using multicast or broadcast. FIG. 3 illustrates an alternative example in which separate devices are responsible for unicast and broadcast or multicast output of media data.

Figure 4:
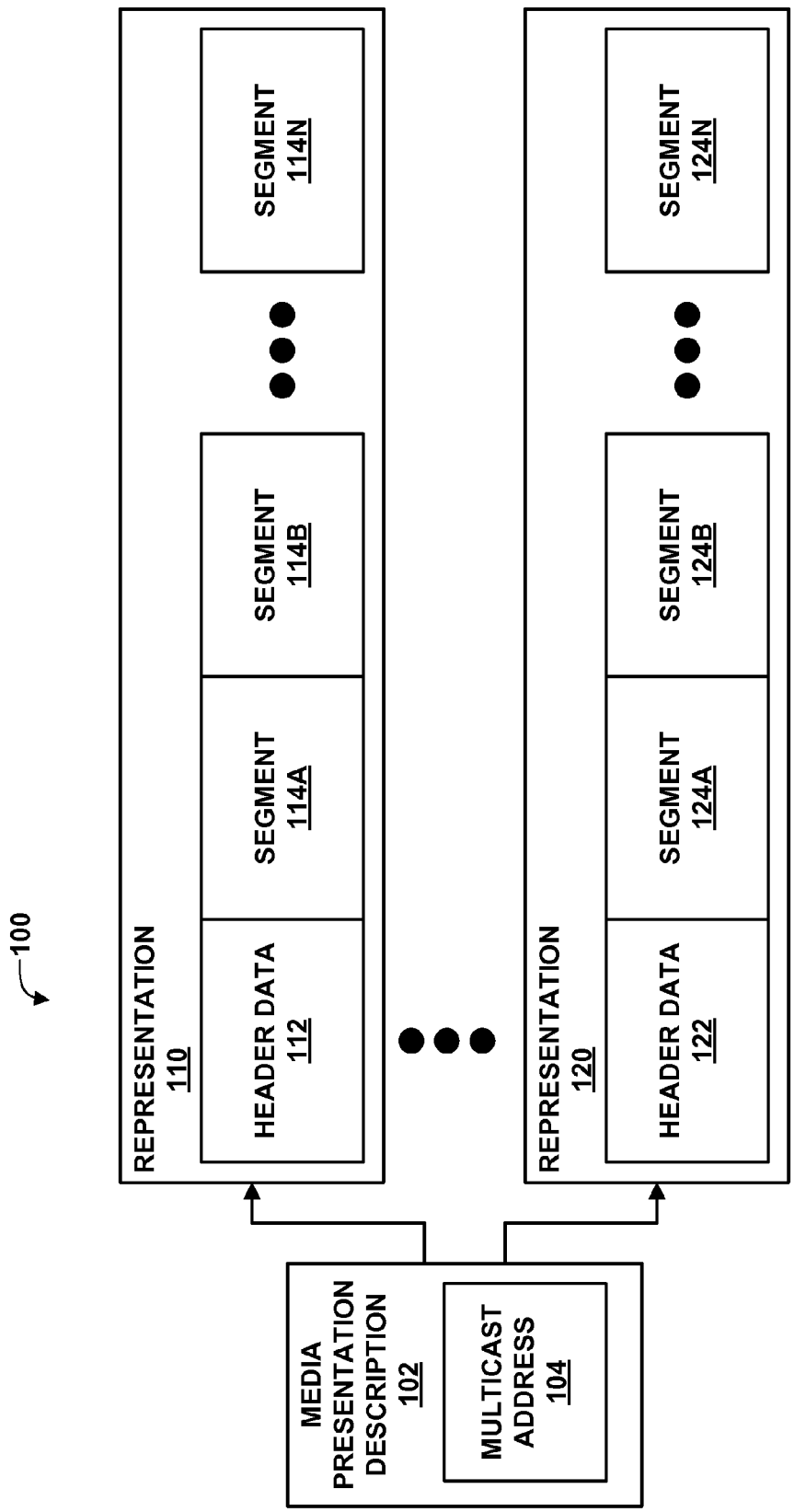
FIG. 4 is a conceptual diagram illustrating elements of example media content.

FIG. 4 is a conceptual diagram illustrating elements of example media content 100. Multimedia content 100 may correspond to multimedia content 64 (FIG. 1), or another multimedia content stored in memory 62. In the example of FIG. 4, multimedia content 100 includes media presentation description (MPD) 102 and a plurality of representations 110-120. Representation 110 includes optional header data 112 and segments 114A-114N (segments 114), while representation 120 includes optional header data 122 and segments 124A-124N (segments 124). The letter N is used to designate the last movie fragment in each of representations 110,120 as a matter of convenience. In some examples, there may be different numbers of movie fragments between representations 110,120.

MPD 102 may comprise a data structure separate from representations 110-120. MPD 102 may correspond to manifest file 66 of FIG. 1. Likewise, representations 110-120 may correspond to representations 68 of FIG. 1. In general, MPD 102 may include data that generally describes characteristics of representations 110-120, such as coding and rendering characteristics, adaptation sets, a profile to which MPD 102 corresponds, text type information, camera angle information, rating information, trick mode information (e.g., information indicative of representations that include temporal sub-sequences), and/or information for retrieving remote periods (e.g., for targeted advertisement insertion into media content during playback). Remote periods may also be referred to as external periods. FIGS. 4-7, discussed in greater detail below, illustrate various examples of multimedia content with various elements included in either or both of an MPD and/or representations (such as within segments of representations or header data of representations). Any or all of the MPDs of FIGS. 4-7 may correspond substantially to MPD 102 of FIG. 4.

In accordance with the techniques of this disclosure, MPD 102 of FIG. 4 may specify information such as, for example, URLs of segments 114 and/or 124 that can be unicast and multicast group address 104 for joining a multicast group to retrieve data of any of representations 110-120 that can be multicast. Alternatively, MPD 102 may include data for retrieving network broadcast data.

In one example, data of representation 110 may be output using unicast, while data of representation 120 may be output using multicast or broadcast. Of course, data of other representations of multimedia content 100 (not shown, but represented by ellipses) may also be output using any or all of multicast, broadcast, or unicast.

Header data 112, when present, may describe characteristics of segments 114, e.g., temporal locations of random access points, which of segments 114 includes random access points, byte offsets to random access points within segments 114, uniform resource locators (URLs) of segments 114, or other aspects of segments 114. Header data 122, when present, may describe similar characteristics for segments 124. Additionally or alternatively, such characteristics may be fully included within MPD 102.

Segments 114 include one or more coded video samples, each of which may include frames or slices of video data. Each of the coded video samples of segments 114 may have similar characteristics, e.g., height, width, and bandwidth requirements. Such characteristics may be described by data of MPD 102, though such data is not illustrated in the example of FIG. 4. MPD 102 may include characteristics as described by the 3GPP Specification, with the addition of any or all of the signaled information described in this disclosure.

Each of segments 114, 124 may be associated with a unique uniform resource identifier (URI), e.g., a uniform resource locator (URL). Thus, each of segments 114, 124 may be independently retrievable using a streaming network protocol, such as DASH. In this manner, a destination device, such as client device 40, may use an HTTP GET request to retrieve segments 114 or 124. In some examples, client device 40 may use HTTP partial GET requests to retrieve specific byte ranges of segments 114 or 124. Alternatively, in accordance with the techniques of this disclosure, as an example, segments 114 may be sent using unicast, in response to HTTP GET requests, while segments 124 may be broadcast or multicast.

As noted above, MPD 102 may conform to a particular MPD profile. MPD 102 may include information indicative of a Multipurpose Internet Mail Extension (MIME) type for MPD 102 and/or multimedia content 100. MIME types generally do not indicate what codec is needed to present multimedia content, however. In general, it is assumed that if a device can retrieve an MPD for multimedia content, such as MPD 102, that the device can playback data of the multimedia content corresponding to the MPD. However, this assumption may not always be safe. Therefore, in some examples, MPD 102 may include information indicative of a profile to which MPD 102 corresponds.

There may be a relatively small number of profiles to which MPDs may correspond. Profiles may be supported by levels to address capabilities, similar to the manner in which H.264/AVC includes profiles and levels for video coding. MPD profiles may be onion-shelled, in that a higher profile may include all features of all lower profiles. There may be a registration process with a registration authority to register various profiles. In some examples, a client device, such as client device 40, may be configured to retrieve information indicative of the profile for the MPD, such as MPD 102, before retrieving other data of the MPD, such as characteristics of representations 110-120 signaled by MPD 102. In this manner, the profile for MPD 102 may be signaled before access to MPD 102 is provided.

A profile identifier may be provided in plain text (e.g., as a plain name), or a reversed domain name. Plain names may be reserved by a registration authority, such as 3GPP or another registration authority. A profile may be considered a claim and a permission, in that the profile may claim that a corresponding multimedia content conforms to the profile and gives permission to a reader (e.g., a client device) that implements that profile to read the MPD, interpret what it recognizes, and ignore material that it does not understand.

Profiles may describe characteristics such as, for example, features of MPD 102, usage of the network, media format(s), codec(s) used, protection formats, and/or quantitative measures such as bitrates, screen sizes, and the like. In this manner, the profile of MPD 102 may provide information indicative of what codecs need to be supported in order to retrieve data of MPD 102 and/or multimedia content 100. Profiles may also be described as "conformance points." Profiles with which an MPD complies may be indicated in a "Profiles" attribute of the MPD. Thus, a client device may be configured to retrieve a portion of MPD 102 including information relating to the "Profiles" attribute before retrieving additional data of MPD 102. Alternatively, profiles may be indicated as a parameter in the MIME type of the MPD. For example, profiles "X, Y, and Z" may be signaled in the following fashion:

video/vnd.mpeg.mpd;profiles="X,Y,Z."

Figure 5:
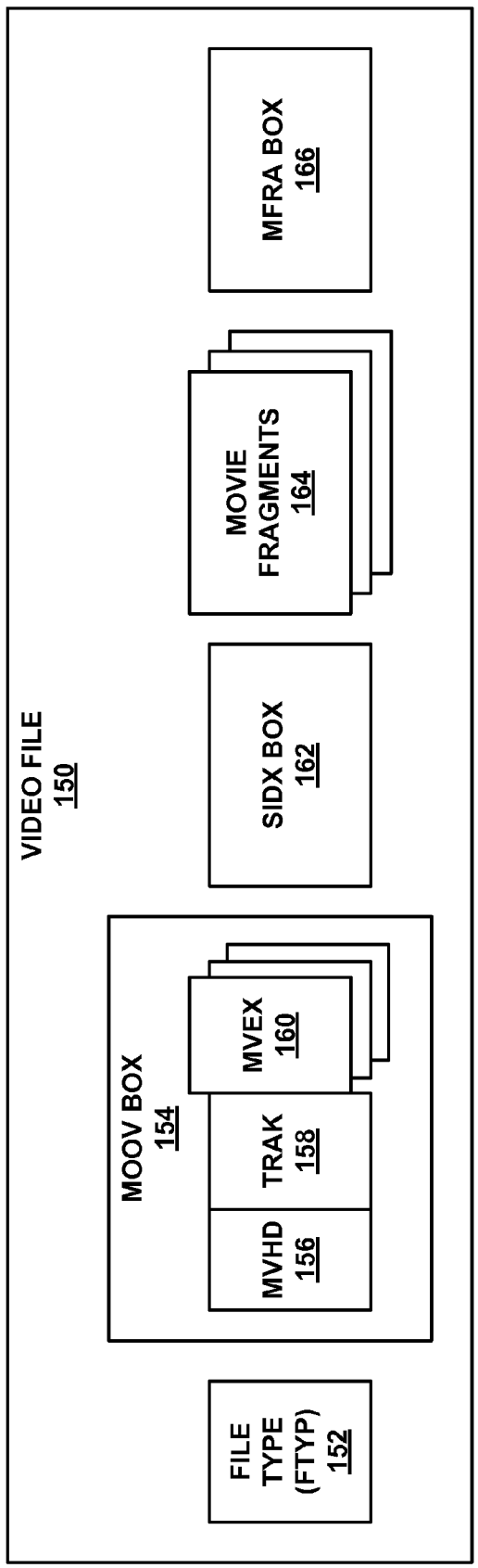
FIG. 5 is a block diagram illustrating elements of an example video file, which may correspond to a segment of a representation of media content.

FIG. 5 is a block diagram illustrating elements of an example video file 150, which may correspond to a segment of a representation, such as one of segments 114, 124 of FIG. 4. Each of segments 114, 124 may include data that conforms substantially to the arrangement of data illustrated in the example of FIG. 5. As described above, video files in accordance with the ISO base media file format and extensions thereof store data in a series of objects, referred to as "boxes." In the example of FIG. 5, video file 150 includes file type (FTYP) box 152, movie (MOOV) box 154, segment index (SIDX) box 162, movie fragments 164 (also referred to as movie fragment boxes (MOOF)), and movie fragment random access (MFRA) box 166.

Video file 150 generally represents an example of a segment of multimedia content, which may be included in one of representations 110-120 (FIG. 4). In this manner, video file 150 may correspond to one of segments 114, one of segments 124, or a segment of another representation. In accordance with the techniques of this disclosure, segments, formatted in a manner similar to video file 150, may be sent using FLUTE, whether unicast, multicast, or broadcast.

In the example of FIG. 5, video file 150 includes SIDX box 162. In some examples, video file 150 may include additional SIDX boxes, e.g., between movie fragments 164. In general, SIDX boxes, such as SIDX box 162, include information that describes byte ranges for one or more of movie fragments 164. In other examples, SIDX box 162 and/or other SIDX boxes may be provided within MOOV box 154, following MOOV box 154, preceding or following MFRA box 166, or elsewhere within video file 150.

File type (FTYP) box 152 generally describes a file type for video file 150. File type box 152 may include data that identifies a specification that describes a best use for video file 150. File type box 152 may be placed before MOOV box 154, movie fragment boxes 162, and MFRA box 166.

MOOV box 154, in the example of FIG. 5, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158.

In some examples, video file 150 may include more than one track, although this is not necessary for the DASH protocol to work. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 1) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture includes one or more VCL NAL units which contain the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of the movie fragments 164 may include a movie fragment header box (MFHD, not shown in FIG. 5). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations within video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In accordance with the techniques of this disclosure, a client device, such as client device 40, may use data of MFRA box 166 and/or SIDX box 162 to determine locations of switch points (that is, random access points) among movie fragments 164. In this manner, when the client device receives a video file including a random access point or switch point via FLUTE over broadcast or multicast, the client device may begin decoding from the random access point. Thus, the client device may switch to the representation from which the video file was received according to broadcast or multicast, and not request further data for retrieval using unicast, following the switch point. To attempt to ensure that a switch point has been retrieved, the client device may request and buffer at least as much data from a representation received via unicast as corresponds to a temporal section of video data between switch points of a representation received (or to be received) via broadcast or multicast.

MFRA box 166 and/or SIDX box 162 may provide information such as, for example, a temporal position (in terms of playback) of a switch point, a byte offset to reach the switch point (e.g., a byte offset from the beginning of video file 150 to the beginning of one of movie fragments 164 including the switch point), or other characteristics of switch points in video file 150.

In some examples, data of video file 150 may include caching information, such as caching primitives, indicating how data of video file 150 should be cached. In this manner, devices configured to cache data, such as a proxy caching device (e.g., proxy caching device 82 of FIG. 2) or a client device (e.g., client device 40) may retrieve cached data in response for a request. That is, rather than forwarding a request for data of media content to a server, a client device or a proxy cache device may service the request using the cached data, assuming that the cached data has not expired.

Figure 6:
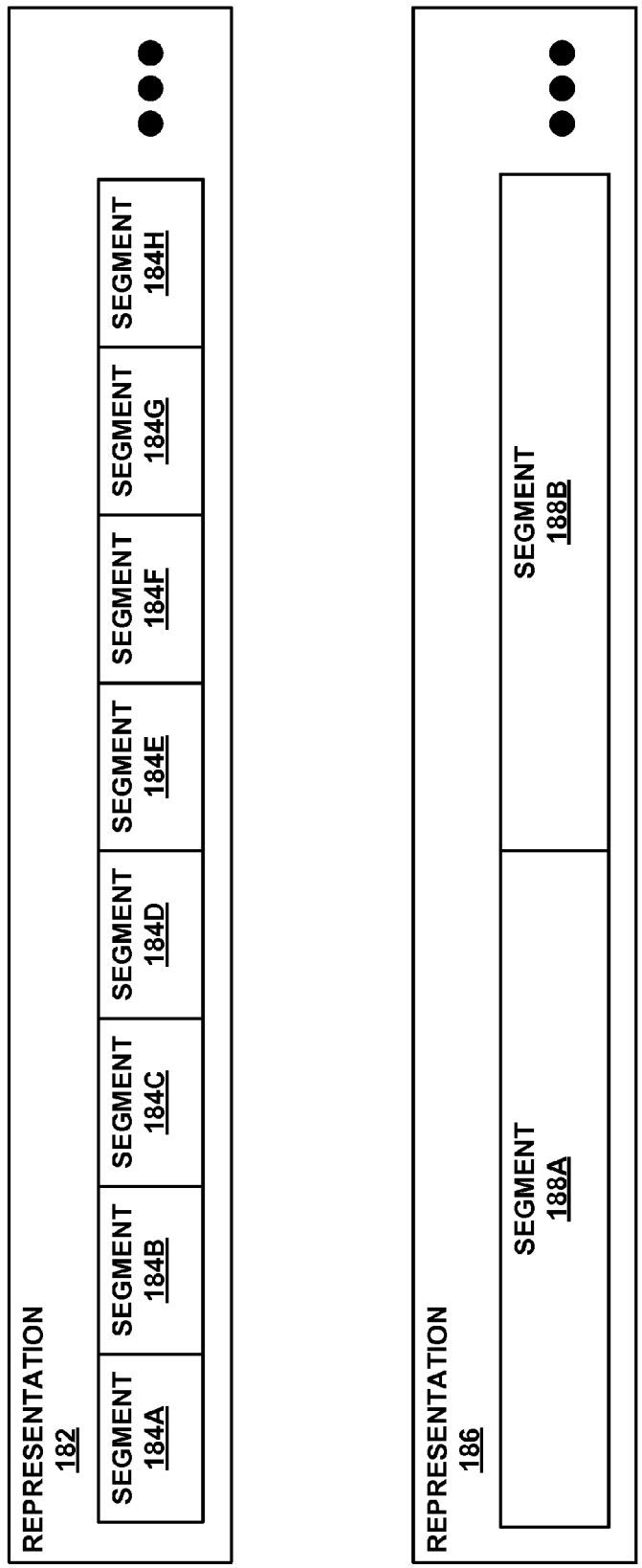
FIG. 6 is a conceptual diagram illustrating example media content including two representations.

FIG. 6 is a conceptual diagram illustrating example media content 180 including two representations 182, 186. In this example, representation 182 includes segments 184A-184H (segments 184), while representation 186 includes segments 188A and 188B (segments 188). Although a limited number of segments is shown in FIG. 6, each of the representations may include additional segments, as indicated by ellipses. In the example of FIG. 6, the temporal duration of segments is generally shown by the width of the segments. Thus, segments 184 of representation 182 generally have a shorter temporal duration than segments 188 of representation 186. Assume, for purposes of example, that each of segments 184, 188 begins with a switch point (that is, a random access point).

In accordance with the techniques of this disclosure, client device 40 may receive a request to access media content 180. Assuming that client device 40 has not yet cached data of media content 180, client device 40 may request to retrieve data of media content 180. Suppose, for example, that client device 40 receives a request from a user to access data of media content 180 at a time when broadcast server device 90 is broadcasting data approximately halfway through segment 188A. Conventionally, client device 40 would need to wait until data of segment 188B had been received before presenting data of media content 180, because the next switch point of representation 186 would occur at the beginning of segment 188B.

However, in accordance with the techniques of this disclosure, client device 40 may buffer data received via multicast or broadcast, but also request unicast data. In this example, client device 40 may request one or more of segments 184 for receipt via unicast. For example, client device 40 may request each of segments 184A-184D, and retrieve data for these segments via unicast. In this manner, client device 40 may decode and display data of segments 184A-184D from representation 182 while waiting for the next switch point of representation 186 to arrive. Thus, client device 40 may present a user with data corresponding to representation 182 until receiving segment 188B. After receiving data of segment 188B, client device 40 may stop requesting segments 184 and receive only data of segments 188 from representation 186, e.g., segment 188B and beyond.

Accordingly, in one example, client device 40 may retrieve any or all of segments 184A-184D via unicast, and segment 188B and subsequent segments of representation 186 via broadcast or multicast, e.g., in accordance with FLUTE. Furthermore, client device 40 may cache data of segment 188B and subsequent segments of representation 186 for a period of time. In this manner, a user of client device 40 may quickly access data of media content 180 at a later time, without needing retransmission of the data. Moreover, by caching data of segments 188, client device 40 may prepopulate a browser cache with data of segments 188 received via broadcast or multicast. In this manner, client device 40 may determine that data is available in the browser cache, such that client device 40 need not retrieve the data using unicast.

FIG. 7 is a block diagram illustrating examples of network stacks for unicast and multicast. FIG. 7 illustrates an example of unicast network stack 200A and an example of multicast network stack 200B. In both example network stacks, application(s) data 202 is transported, e.g., for a DASH client on a client device. In general, the various layers from top to bottom of network stacks 200A, 200B correspond to network layers as defined in the open systems interconnection (OSI) network model.

The example of network stack 200A includes service announcements and metadata 204, associated-delivery procedures 206, and MBMS security 212. Service announcements and metadata 204 includes data provided by a service provider (e.g., a wireless operator) indicating availability of MBMS to wireless customers, such as a user in possession of client device 40. Associated-delivery procedures 206 represents data for procedures that are associated with, and auxiliary to, delivery of data, such as point-to-point (PTP) file repair 208 and reception reporting 210. PTP file repair 208 represents data for assuring error-free reception of files delivered over MBMS. Reception reporting 210 represents data for reception statistics, which may be provided to a broadcast/multicast service center, such as the broadcast or multicast server.

Network stack 200A also includes MBMS security 212, which provides service access protection that provides a level of protection for distributing digital rights management (DRM) protected media content. In particular, MBMS Service Keys (MSK) 216 are sent, which client device 40 decrypts using an MBMS User Key. MSK 216 are sent individually per user in Multimedia Internet KEYing (MIKEY) messages 222. MSK 216 are used to decrypt MBMS Traffic Keys (MTK) 234. Client device 40 uses MTK 234 to decrypt segments of representations of media content received by client device 40. Client device 40 also sends data for registration 214 to indicate that client device 40 is registered to receive the media content.

In this example, MKS 216 and MIKEY 222 are sent over user datagram protocol (UDP) 226. Data for associated-delivery procedures 206 and registration 214, in this example, is sent according to HTTP 218. Moreover, HTTP digest 220 is used for securing the data sent over HTTP 218. In addition, the data sent over HTTP 218 is sent over transmission control protocol (224). Both the data sent via TCP 224 and UDP 226 is encapsulated within Internet protocol (IP) 228, which for network stack 200A is sent via unicast. Moreover, the data for IP (Unicast) 228 is sent over a point-to-point (PTP) bearer 230. In this example, a bearer may be a radio channel for MBMS.

Network stack 200B includes MBMS security 232, which is similar to MBMS security 212, in that MBMS security 232 corresponds to MTK 234 and MIKEY 236, which is similar to MIKEY 222. In this example, forward error correction (FEC) 238 provides data for correcting errors without retransmission, e.g., for security-related data of MBMS security 232, MTK 234, MIKEY 236.

Network stack 200B also includes data for streaming CODECs 240, which may include data for CODECs such as audio data, video data, speech data, text data, and the like. In accordance with the techniques of this disclosure, this data is formatted according to the DASH file format 242, e.g., as described above with respect to FIGS. 4 and 5. Network stack 200B also includes data formatted according to the 3GPP file format 244, which may include binary data, still images, text, and other such data. Associated delivery procedures 246 correspond substantially to associated delivery procedures 206, and include data for point-to-multipoint (PTM) file repair 248. Data of PTM file repair 248 allows a server device to send additional MBMS data after the actual MBMS data transfer. Likewise, service announcements and metadata 250 corresponds substantially to service announcements and metadata 204.

In the example of network stack 200B, in accordance with the techniques of this disclosure, the DASH data (DASH file format 242 encapsulated CODEC data of streaming CODEC 240), data of 3GPP file format 244, and data of associated-delivery procedures 246 such as data of PTM file repair 248 are sent over FLUTE 252, which is sent over ALC 254. In addition, data may be provided for layered coding transport (LCT) 256, congestion control (CC) 258, and FEC 260. In the example of network stack 200B, this data is sent either over IP multicast or IP unicast 262, which is sent over MBMS or PTP bearers 264.

In this manner, network stack 200B represents an example in which DASH-formatted media data can be sent over the FLUTE protocol, in accordance with the techniques of this disclosure. Thus, network stack 200B illustrates how FLUTE can serve as an alternative transport to RTP for streaming delivery. This enables broadcast (or multicast) and unicast convergence via DASH. In addition, because timing and synchronization are native to the DASH format, timing and synchronization as provided in RTP are not necessary. The techniques of this disclosure may therefore allow a single broadcast transport paradigm for both file and streaming services. There is also no longer a need for packet switched streaming (PSS) to provide continuity of MBMS streaming service delivery to a client device located outside the MBMS service area, as HTTP streaming should suffice.

Figure 8:
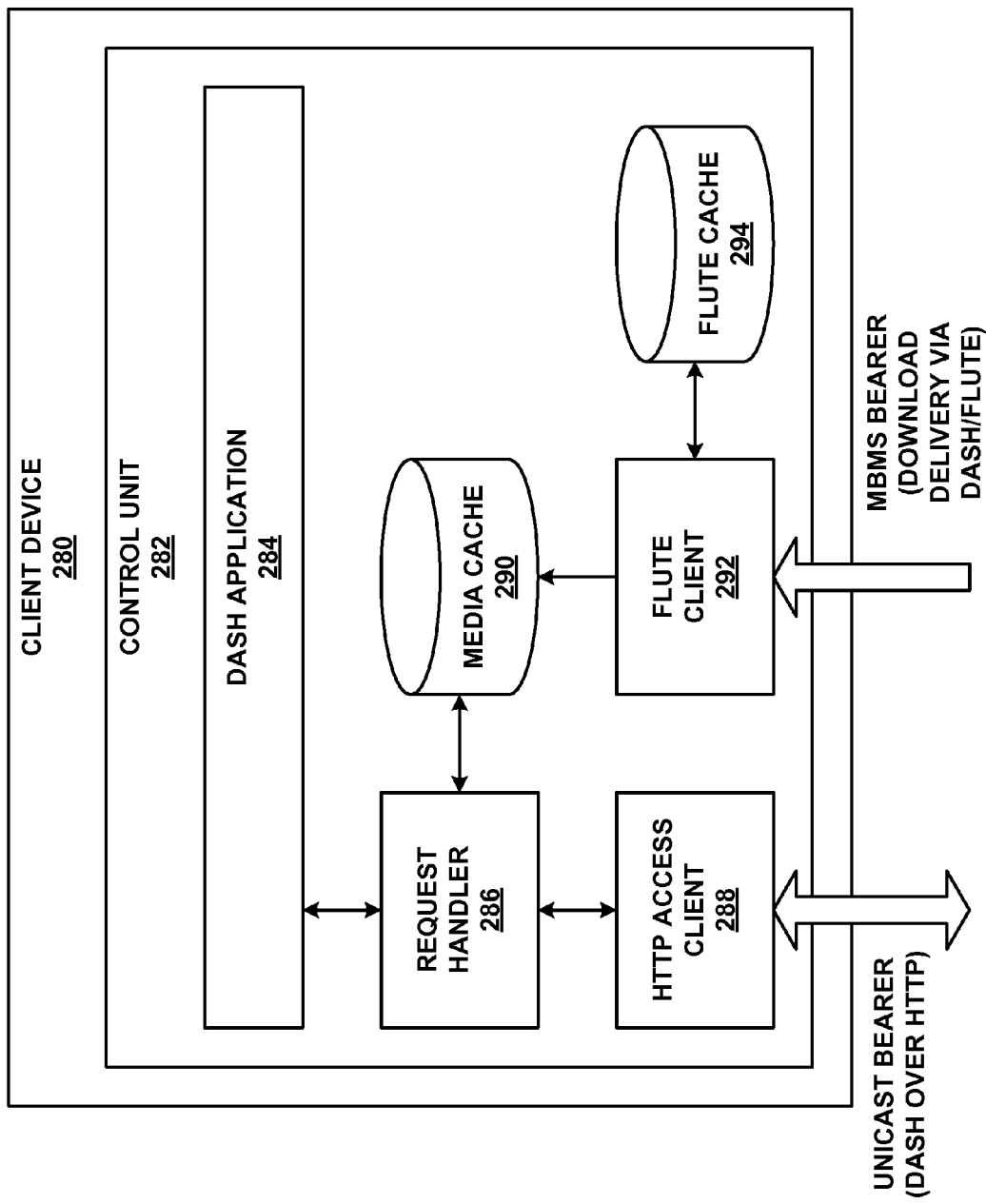
FIG. 8 is a block diagram illustrating another example client device.

FIG. 8 is a block diagram illustrating another example client device 280. In general, client device 280 may correspond to client device 40. The example of FIG. 8 illustrates components of a client device in greater detail. In this example, client device 280 includes control unit 282, which may represent hardware, software, and/or firmware for performing the functionality attributed to control unit 282. When implemented in software or firmware, it is assumed that control unit 282 includes requisite hardware, such as one or more processing units and/or one or more hardware-based computer-readable media for storing software or firmware instructions.

In this example, control unit 282 includes DASH application 284, request handler 286, HTTP access client 288, FLUTE client 292, media cache 290, and FLUTE cache 294. In some examples, only a single cache is provided (e.g., media cache 290), such that a separate cache for FLUTE cache 294 is not necessary. DASH application 284 may correspond to a web browser or a web browser plug-in for performing the techniques of DASH. In some examples, DASH application 284 includes a media player, while in other examples, control unit 282 includes a separate media player application. Although not shown in FIG. 8, it is also assumed that control unit 282 includes requisite decoders for decoding audio, video, and other media data, e.g., as shown in FIG. 1.

A user may interact with DASH application 284 to select media content, e.g., a particular movie available on the Internet. DASH application 284 may issue an HTTP request to request handler 286. Request handler 286 may service the request by either retrieving the requested content from media cache 290 (e.g., when the requested media content has been previously accessed and cached in media cache 290) or by initiating a streaming request over a unicast network, e.g., via HTTP access client 288. In this manner, media cache 290 and FLUTE cache 294 represent examples of a local memory in which media data received via a file delivery service, such as FLUTE, may be cached. Moreover, request handler 286 may query the cache implemented by the local memory in response to a DASH request from DASH application 284. When the data is in the cache, a cache "hit" may occur, and request handler 286 may service the request using data from the cache. On the other hand, when the data is not in the cache, a cache "miss" may occur, causing request handler 286 to send a unicast request for the data via HTTP access client 286.

In general, DASH application 284 may be configured to select a representation from among a plurality of representations for a particular media content. Assuming that the plurality of representations correspond to an adaptation set, or that the plurality of representations otherwise satisfy coding and rendering capabilities of client device 280, DASH application 284 may select a representation from among the plurality of representations based on an amount of network bandwidth and bitrates for the representations. For example, DASH application 284 may implement a rate-estimation algorithm that calculates delivery delay for each of the available representations.

When media data for the media content is cached in the local memory, the rate-estimation algorithm may indicate that the delivery delay for the corresponding representation is virtually zero. Therefore, when media data for a representation of media content is cached in a local memory (such as media cache 290 or FLUTE cache 294), the rate-estimation algorithm may determine that the representation corresponding to the cached data is best. Therefore, unless DASH application 284 has received a different, explicit request for a user, DASH application 284 may naturally select the representation corresponding to the cached data in the local memory, when selecting one of the plurality of representations. In this manner, by pre-populating the cache with media content received via broadcast or multicast (e.g., by FLUTE client 292), DASH application 284 may automatically select the representation broadcasted or multicasted by a server device, based on the cached data for the representation having a calculated delivery delay of virtually zero.

In cases where media cache 290 does not include cached data for requested media content, control unit 282 may cause FLUTE client 292 to subscribe to a multicast group to receive the media data in the form of a broadcast or multicast. FLUTE client 292 may receive the broadcast or multicast over an MBMS bearer. Furthermore, as FLUTE client 292 receives the broadcast or multicast, FLUTE client 292 stores the received data to media cache 290. In this manner, when DASH application 284 subsequently requests data of a subsequent segment from request handler 286, request handler 286 may determine that the media data is stored in media cache 290. Accordingly, after a sufficient amount of data has been received via broadcast or multicast (e.g., after a segment including a switch point has been received), request handler 286 need not issue further requests for media data to HTTP access client 288, but instead may retrieve media content from media cache 290.

In particular, in accordance with the techniques of DASH, DASH application 284 may be configured to request media content sequentially. Therefore, in response to a first request for media content, if the media content is not present in media cache 290, request handler 286 may cause HTTP access client 288 to issue one or more GET or partial GET requests to retrieve segments of the media content via unicast, while also causing FLUTE client 292 to request to join a multicast group for the media content. In response to subsequent requests from DASH application 284 for the media content (that is, a sequentially later portion of the media content), request handler 286 may again determine whether the requested media content is available in media cache 290, and if not, cause HTTP access client 288 to issue one or more subsequent GET or partial GET requests for the media content. Request handler 286 may continue causing HTTP access client 288 to retrieve unicast data until data of the multicast or broadcast is available in media cache 290 (e.g., after a switch point of a representation is stored in media cache 290). Furthermore, control unit 282 may keep data stored in media cache 290 for an extended period of time, rather than deleting the data immediately or soon after playback by DASH application 284.

In this manner, client device 280 represents an example of a device for retrieving information for video data, including one or more processing units configured to send, via a network, a request to retrieve at least a portion of media content, wherein the media content conforms to dynamic adaptive streaming over HTTP (DASH), and wherein the request comprises a request that at least a portion be delivered according to File Delivery over Unidirectional Transport (FLUTE) protocol, and, in response to the request, to receive streaming data for the at least portion of the media content in accordance with the FLUTE protocol over the network.

Figure 9:
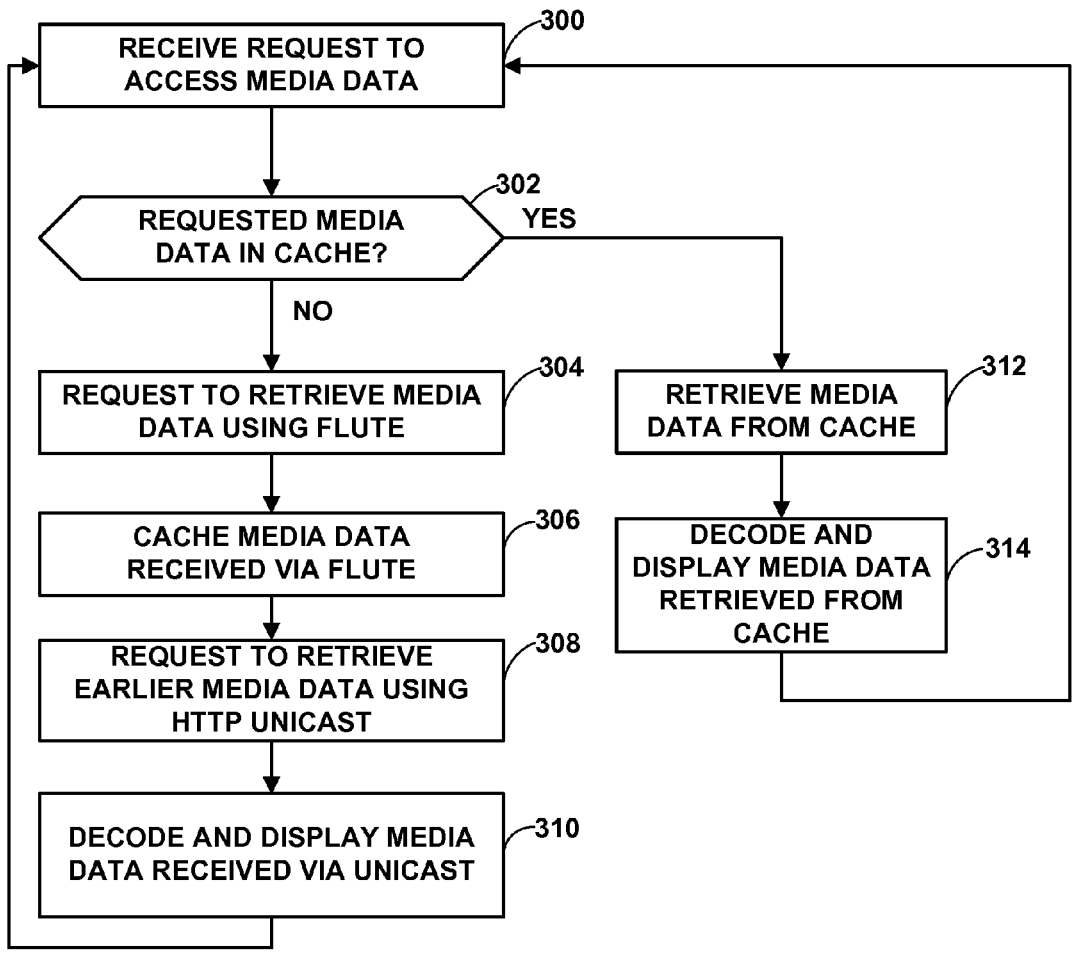
FIG. 9 is a flowchart illustrating an example method for receiving media data either over unicast or broadcast or multicast, in accordance with the techniques of this disclosure.

FIG. 9 is a flowchart illustrating an example method for receiving media data either over unicast or broadcast or multicast, in accordance with the techniques of this disclosure. Although described with respect to the example of client device 280 of FIG. 8 for purposes of example, it should be understood that other devices may be configured to perform similar techniques. For example, client device 40 of FIGS. 1-3 may be configured to perform the method of FIG. 9. The method of FIG. 9 generally includes prepopulating a cache (such as media cache 290) using data received via broadcast or multicast in accordance with a file delivery service, such as the FLUTE protocol, to effect streaming over broadcast or multicast.

In this example, client device 280 initially receives a request to access media data (300). For example, DASH application 284 may receive a request from a user of client device 280 to access media content. As described with respect to FIG. 8, DASH application 284 may send a request to request handler 286 for the media data. Request handler 286, in turn, may determine whether the requested media data is currently cached within media cache 290 (302). If the media data is not in the cache ("NO" branch of 302), request handler 286 may cause FLUTE client 292 to request to retrieve the media data using FLUTE (304). For example, FLUTE client 292 may subscribe to a multicast group to begin receiving data of the media content via multicast or broadcast in accordance with FLUTE. As FLUTE client 292 receives media data via FLUTE, FLUTE client 292 may cache the received media data in FLUTE cache 294 and/or media cache 290 (306).

In addition, request handler 286 may cause HTTP access client 288 to request to retrieve earlier media data using HTTP unicast (308). The data requested via HTTP unicast need not necessarily be earlier than the current temporal location of the broadcast or multicast, but in many cases will be earlier than the point of the broadcast or multicast at which a switch point is received, and is therefore earlier in this sense. Client device 280 may decode and display media data received via unicast (310). That is, while awaiting the arrival of a switch point via broadcast or multicast, client device 280 may decode and display data received via unicast. In particular, after HTTP access client 288 receives requested data via unicast, HTTP access client 288 may send the data to request handler 286, which may store the data to media cache 290 and send the data to DASH application 284. DASH application 284 may, in turn, send the data to appropriate CODECs (not shown in FIG. 8) for decoding, and direct the decoded data to user interfaces (not shown in FIG. 8), such as a display for decoded video (as well as textual overlays, if any) and speakers for decoded audio. The process may then repeat, with DASH application 284 requesting a subsequent segment of the media content, which may or may not have yet been cached in media cache 290.

After a switch point (and perhaps a certain minimal amount of additional data following the switch point) of a representation of the media content has been received via broadcast or multicast and stored in media cache 290, request handler 286 may determine that the media data requested by DASH application 284 is in media cache 290 ("YES" branch 302). In response, request handler 286 may retrieve the requested media data from media cache 290 (312) and send the requested media data to DASH application 284. Likewise, DASH application 284 may decode and display the media data retrieved from media cache 290 (314). Although not explicitly shown in the method of FIG. 9, it is assumed that FLUTE client 292 will continue to receive data of the media content via FLUTE, and to continue storing the received data to media cache 290. Thus, request handler 286 should determine that media data of subsequent requests can be satisfied using data of media cache 290. Of course, if a user changes to different media content, or if there are network interruptions of the broadcast or multicast, client device 280 may perform the techniques of this disclosure to effect a channel change or to switch back to unicast temporarily until sufficient data of the media content has been buffered in media cache 290.

The techniques of this disclosure of allowing for both unicast and broadcast or multicast for transport of DASH may provide advantages in a variety of scenarios. For example, as discussed above, these techniques may allow a client device to begin playout of media content (in particular, of data received via unicast) sooner than simply waiting for a switch point to be received via broadcast or multicast, because the client device may retrieve, via unicast, data of a representation having more frequent switch points. As another scenario, the quality of a representation being broadcast or multicast may not be sufficiently high for a particular user. Such a user may request retransmission of data for a particular temporal section of the media content via unicast to retrieve data at a different quality level. For example, there may be fine details that appear blurry or difficult to see in playout of the representation being broadcast or multicast, and thus, the user may request data from a higher quality representation for a corresponding temporal section. The client device may continue to buffer data of the broadcast or multicast, but also request data of the higher quality representation using unicast.

In this manner, the method of FIG. 9 represents an example of a method including sending, via a network, a request to retrieve at least a portion of media content, wherein the media content conforms to dynamic adaptive streaming over HTTP (DASH), and wherein the request comprises a request that at least a portion be delivered according to File Delivery over Unidirectional Transport (FLUTE) protocol, and, in response to the request, receiving streaming data for the at least portion of the media content in accordance with the FLUTE protocol over the network. Moreover, the example method of FIG. 9 further includes retrieving a first portion of the media content in accordance with a unicast protocol. Also, in the example method of FIG. 9, sending the request to retrieve the at least portion may include sending the request to retrieve a second portion of the media content, wherein the first portion is temporally earlier within the media content than the second portion, and wherein the first portion has a temporal length that is at least as long as a temporal period between switch points in the second portion.

FIG. 10 is a flowchart illustrating an example method for outputting DASH media content using a file delivery service, such as FLUTE. Although described with respect to the example of server device 60 of FIGS. 1 and 2, it should be understood that other devices may be configured to perform the method of FIG. 10. For example, broadcast server device 90 of FIG. 3 may be configured to perform this or a similar method.

In this example, server device 60 may receive media content (350), e.g., from content preparation device 20 (FIG. 1). The media content may be formatted according to DASH. That is, the media content may include various different representations, which may be categorized into adaptation sets with common coding and rendering characteristics. Representations of different adaptation sets may have different coding and/or rendering characteristics. Server device 60 may determine an address for a multicast group (352). Server device 60 may also advertise the address for the multicast group in an MPD file for the media content (354). Server device 60 may also output the MPD file (356).

In this example, server device 60 also selects one of the representations of the media content (358). For example, server device 60 may receive a selection of a representation from a user, such as an administrator. Alternatively, server device 60 may select the representation based on network conditions, such as a determined amount of network bandwidth that is available and/or a number of users subscribed to the multicast group. In any case, server device 60 may then output data of the selected representation to the multicast group (360). That is, server device 60 may set an Internet protocol (IP) address of the multicast group as the destination address of the output. Moreover, server device 60 may output the data in accordance with a file delivery service, such as the FLUTE protocol. Sending the data to the address of the multicast group may cause routers in the network to replicate and forward the data of the multicast to devices that have subscribed to the multicast group, such as client devices, e.g., client device 40.

Server device 60 may also determine whether there has been a change in network conditions (e.g., a change in available network bandwidth) and/or a change in a number of users who have subscribed to the multicast group (362). If there has not been such a change ("NO" branch of 362), server device 60 may continue to output data of the selected representation to the multicast group (360). Alternatively, if there has been a change ("YES" branch of 362), server device 60 may select a different representation (364). For example, if the number of users has increased, server device 60 may select a representation with a lower bitrate, whereas if the number of users has decreased, server device 60 may select a representation with a higher bitrate.

In addition, although not shown in the example of FIG. 10, server device 60, or a different server device, may receive a unicast request for data of the media content. Such a request may be received at any time. In accordance with the techniques of this disclosure, the request may be for data from a different representation than that selected by server device 60, e.g., a representation with relatively more frequent switch points. In response, server device 60, or another server device, may send the requested data to the requesting device.

In this manner, the method of FIG. 10 represents an example of a method including obtaining media content conforming to dynamic adaptive streaming over HTTP (DASH), and outputting data of the media content in accordance with a file delivery service over a network. The method may further include receiving a request for a first portion of the media content from a client device, wherein the request comprises a request for the first portion of the media content in accordance with a unicast protocol, and outputting data for the first portion in accordance with the unicast protocol. Outputting the data of the media content in accordance with the file delivery service may include outputting a second portion of the media content in accordance with the file delivery service, and the first portion may be temporally earlier within the media content than the second portion.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of retrieving information for video data, the method comprising:
   retrieving a first portion of media content from a first representation in accordance with a unicast protocol, wherein the media content conforms to an adaptive video streaming network protocol; and
   retrieving a second portion of the media content from a second representation in accordance with a multicast protocol via a file delivery service, wherein the first portion and the second portion are temporally consecutive in the media content, wherein segments of the first representation corresponding to the first and second portions have a first temporal duration, wherein segments of the second representation corresponding to the first and second portions have a second temporal duration, and wherein the second temporal duration is longer than the first temporal duration.

2. The method of claim 1, wherein retrieving the second portion in accordance with the multicast protocol comprises either requesting to join an Internet protocol (IP) multicast group or registering to receive broadcast file delivery.

3. The method of claim 2, wherein retrieving the second portion comprises requesting to join the IP multicast group, the method further comprising receiving an IP address for the IP multicast group.

4. The method of claim 1, wherein the first portion has different coding characteristics than the second portion.

5. The method of claim 1, wherein the file delivery service comprises File Delivery over Unidirectional Transport (FLUTE), the method further comprising receiving File Delivery Table (FDT) attributes indicating one or more unicast uniform resource locators (URLs) for the media content.

6. The method of claim 1, wherein retrieving the second portion comprises receiving the second portion via a file broadcast service over a broadcast media access control (MAC) protocol.

7. The method of claim 5, wherein the broadcast MAC protocol comprises enhanced Multimedia Broadcast Multicast Service (eMBMS).

8. The method of claim 1, further comprising caching, in local memory, the data for the second portion of the media content received in accordance with the file delivery service.

9. The method of claim 8, further comprising, in response to a subsequent request for the at least portion of the media data, retrieving the cached data from the local memory.

10. The method of claim 8, wherein caching comprises:
   receiving values for one or more caching primitives in accordance with the file delivery service; and
   caching the data for the at least portion in accordance with the values for the one or more caching primitives.

11. The method of claim 10, wherein the one or more caching primitives include one or more of a date primitive indicative of a date on which the at least portion of the media content was sent, an expires primitive indicative of when the at least portion of the media content expires, an entity tag (ETag) that identifies a specific version of the media content, and a Cache-Control header indicating that data of the media content is cacheable.

12. The method of claim 8, wherein retrieving the first portion of the media content comprises:
   determining whether the first portion of the media content is currently stored in a cache; and
   retrieving the first portion of the media content in accordance with the unicast protocol when the first portion of the media content is not currently stored in the cache.

13. The method of claim 1, wherein the second portion of the media content follows the first portion of the media content temporally consecutively, wherein retrieving the first portion of the media content comprises:
   querying a cache to determine whether the first portion of the media content is present in the cache; and
   when the content is not present, implicitly determining that a handover has occurred between a broadcast transport and a unicast transport,
   wherein retrieving the first portion of the media content in accordance with the unicast protocol comprises, when the query of the cache indicates that the first portion of the media content is not present in the cache and based on the determination that the handover has occurred:
      submitting a file download request to retrieve the first portion of the media content in accordance with the unicast protocol; and
      storing the first portion of the media content it in the cache.

14. The method of claim 13, wherein the file download request comprises a hypertext transfer protocol (HTTP) request.

15. The method of claim 1, wherein the first portion of the media content follows the second portion of the media content temporally consecutively, and wherein retrieving the second portion of the media content comprises:
   determining that a handover has occurred between a unicast transport and a broadcast transport;
   in response to determining that the handover has occurred, subscribing to the file delivery service to retrieve the second portion of the media content; and
   storing the second portion of the media content in a cache.

16. The method of claim 1, wherein the media content comprises one of a plurality of different media contents, each of the plurality of different media contents corresponding to a respective video channel, the method further comprising:
   retrieving and caching the first portions of the plurality of different media contents;
   receiving a user-selection of the one of the plurality of different media contents; and
   playing the first media contents immediately via a cache hit after a request to fetch the first portion of the media content,
   wherein retrieving the second portion of the one of the plurality of different media contents comprises retrieving the second portion of the one of the plurality of different media contents in response to the selection.

17. The method of claim 16, further comprising outputting data from the first portions of each of the plurality of different media contents.

18. The method of claim 17, further comprising displaying video data from each of the first portions of each of the plurality of different media contents substantially simultaneously.

19. The method of claim 1, wherein the media content comprises a second media content of a plurality of different media contents, each of the plurality of different media contents corresponding to a respective video channel, further comprising:
retrieving data of a first media content of the plurality of different media contents; and
receiving a request to change to the second media content after retrieving the data of the first media content,
wherein retrieving the first portion of the second media content and the second portion of the second media content comprises retrieving the first portion of the second media content via unicast and the second portion of the second media content via multicast file download in response to the request to change to the second media content.

20. The method of claim 1, wherein the adaptive video streaming network protocol comprises dynamic adaptive streaming over HTTP (DASH).

21. A device for retrieving information for video data, the device comprising one or more processors configured to retrieve a first portion of media content from a first representation in accordance with a unicast protocol, wherein the media content conforms to an adaptive video streaming network protocol, and retrieve a second portion of the media content from a second representation in accordance with a multicast protocol via a file delivery service, wherein the first portion and the second portion are temporally consecutive in the media content, wherein segments of the first representation corresponding to the first and second portions have a first temporal duration, wherein segments of the second representation corresponding to the first and second portions have a second temporal duration, and wherein the second temporal duration is longer than the first temporal duration.

22. The device of claim 21, further comprising a memory, wherein the one or more processors are further configured to cache, in the memory, the data for the second portion of the media content received in accordance with the file delivery service.

23. The device of claim 22, wherein to retrieve the first portion of the media content, the one or more processors are configured to determine whether the first portion of the media content is currently stored in the memory, and to retrieve the first portion of the media content in accordance with the unicast protocol when the first portion of the media content is not currently stored in the memory.

24. The device of claim 21, further comprising a memory for implementing a cache, wherein the second portion of the media content follows the first portion of the media content temporally consecutively, and wherein to retrieve the first portion of the media content, the one or more processors are configured to query the cache to determine whether the first portion of the media content is present in the cache, and when the content is not present, implicitly determine that a handover has occurred between a broadcast transport and a unicast transport, wherein to retrieve the first portion of the media content in accordance with the unicast protocol, the one or more processors are configured to, when the query of the cache indicates that the first portion of the media content is not present in the cache and based on the determination that the handover has occurred, submit a file download request to retrieve the first portion of the media content in accordance with the unicast protocol, and store the first portion of the media content it in the cache.

25. The device of claim 21, further comprising a memory for implementing a cache, wherein the first portion of the media content follows the second portion of the media content temporally consecutively, and wherein to retrieve the second portion of the media content, the one or more processors are configured to determine that a handover has occurred between a unicast transport and a broadcast transport, in response to determining that the handover has occurred, subscribe to the file delivery service to retrieve the second portion of the media content, and store the second portion of the media content in the cache.

26. A device for retrieving information for video data, the device comprising:
means for retrieving a first portion of media content from a first representation in accordance with a unicast protocol, wherein the media content conforms to an adaptive video streaming network protocol; and
means for retrieving a second portion of the media content from a second representation in accordance with a multicast protocol via a file delivery service, wherein the first portion and the second portion are temporally consecutive in the media content, wherein segments of the first representation corresponding to the first and second portions have a first temporal duration, wherein segments of the second representation corresponding to the first and second portions have a second temporal duration, and wherein the second temporal duration is longer than the first temporal duration.

27. The device of claim 26, further comprising means for caching the data for the second portion of the media content received in accordance with the file delivery service.

28. The device of claim 27, wherein the means for retrieving the first portion of the media content comprises:
means for determining whether the first portion of the media content is currently stored in the means for caching; and
means for retrieving the first portion of the media content in accordance with the unicast protocol when the first portion of the media content is not currently stored in the means for caching.

29. The device of claim 26, wherein the second portion of the media content follows the first portion of the media content temporally consecutively, wherein the means for retrieving the first portion of the media content comprises:
means for querying a cache to determine whether the first portion of the media content is present in the cache; and
means for implicitly determining that a handover has occurred between a broadcast transport and a unicast transport when the content is not present,
wherein the means for retrieving the first portion of the media content in accordance with the unicast protocol comprises:
means for submitting a file download request to retrieve the first portion of the media content in accordance with the unicast protocol when the query of the cache indicates that the first portion of the media content is not present in the cache and based on the determination that the handover has occurred; and
means for storing the first portion of the media content it in the cache when the query of the cache indicates that the first portion of the media content is not present in the cache and based on the determination that the handover has occurred.

30. The device of claim 26, wherein the first portion of the media content follows the second portion of the media content temporally consecutively, and wherein the means for retrieving the second portion of the media content comprises:
 means for determining that a handover has occurred between a unicast transport and a broadcast transport;
 means for subscribing, in response to determining that the handover has occurred, to the file delivery service to retrieve the second portion of the media content; and
 means for storing the second portion of the media content in a cache.

31. A non-transitory computer-readable storage medium having stored therein instructions that, when executed, cause one or more processors to:
 retrieve a first portion of media content from a first representation in accordance with a unicast protocol, wherein the media content conforms to an adaptive video streaming network protocol; and
 retrieve a second portion of the media content from a second representation in accordance with a multicast protocol via a file delivery service, wherein the first portion and the second portion are temporally consecutive in the media content, wherein segments of the first representation corresponding to the first and second portions have a first temporal duration, wherein segments of the second representation corresponding to the first and second portions have a second temporal duration, and wherein the second temporal duration is longer than the first temporal duration.

32. The non-transitory computer-readable storage medium of claim 31, further comprising instructions that cause the one or more processors to cache, in local memory, the data for the second portion of the media content received in accordance with the file delivery service.

33. The non-transitory computer-readable storage medium of claim 32, wherein the instructions that cause the one or more processors to retrieve the first portion of the media content comprise instructions that cause the one or more processors to:
 determine whether the first portion of the media content is currently stored in a cache; and
 retrieve the first portion of the media content in accordance with the unicast protocol when the first portion of the media content is not currently stored in the cache.

34. The non-transitory computer-readable storage medium of claim 31, wherein the second portion of the media content follows the first portion of the media content temporally consecutively, wherein the instructions that cause the one or more processors to retrieve the first portion of the media content comprise instructions that cause the one or more processors to:
 query a cache to determine whether the first portion of the media content is present in the cache; and
 when the content is not present, implicitly determine that a handover has occurred between a broadcast transport and a unicast transport,
 wherein the instructions that cause the one or more processors to retrieve the first portion of the media content in accordance with the unicast protocol comprises, when the query of the cache indicates that the first portion of the media content is not present in the cache and based on the determination that the handover has occurred:
 submit a file download request to retrieve the first portion of the media content in accordance with the unicast protocol; and
 store the first portion of the media content it in the cache.

35. The non-transitory computer-readable storage medium of claim 31, wherein the first portion of the media content follows the second portion of the media content temporally consecutively, and wherein the instructions that cause the one or more processors to retrieve the second portion of the media content comprise instructions that cause the one or more processors to:
 determine that a handover has occurred between a unicast transport and a broadcast transport;
 in response to determining that the handover has occurred, subscribe to the file delivery service to retrieve the second portion of the media content; and
 store the second portion of the media content in a cache.

36. A method of outputting information for video data, the method comprising:
 obtaining media content conforming to an adaptive video streaming network protocol, wherein the media content includes a first representation and a second representation;
 outputting a first portion of the media content from the first representation in accordance with a unicast protocol; and
 outputting a second portion of the media content from the second representation in accordance with a file delivery service, wherein the first portion and the second portion are temporally consecutive in the media content, wherein segments of the first representation corresponding to the first and second portions have a first temporal duration, wherein segments of the second representation corresponding to the first and second portions have a second temporal duration, and wherein the second temporal duration is longer than the first temporal duration.

37. The method of claim 36, wherein the file delivery service comprises File Delivery over Unidirectional Transport (FLUTE) protocol.

38. The method of claim 37, further comprising outputting File Delivery Table (FDT) attributes indicating one or more unicast uniform resource locators (URLs) for the media content.

39. The method of claim 36, wherein the adaptive video streaming network protocol comprises dynamic adaptive streaming over HTTP (DASH).

40. The method of claim 36, further comprising:
 receiving a request for the first portion of the media content from a client device, wherein the request comprises a request for the first portion of the media content in accordance with the unicast protocol; and
 outputting data for the first portion in accordance with the unicast protocol.

41. The method of claim 36, wherein the first representation has at least one of different coding characteristics than the second representation and different rendering characteristics than the second representation.

42. The method of claim 36, wherein outputting the second portion of the media content comprises outputting the second portion of the media content with the file delivery service via at least one of Internet protocol (IP) multicast and enhanced Multimedia Broadcast Multicast Service (eMBMS).

43. The method of claim 36, further comprising outputting one or more caching primitives in accordance with the file delivery service to cause a client device to cache at least one of the first portion of the media content and the second portion of the media content.

44. The method of claim 36, further comprising:
 determining a number of subscriber terminals to the file delivery service in a network sector; and selecting the second representation of the media content based on the determined number of subscriber terminals to the file delivery service in the network sector and bitrates of representations of the media content, wherein outputting the data of the media content comprises outputting data of the selected representation, and the method further comprising causing the subscriber terminals to download and cache the selected media segments at the bitrate of the selected representation.

45. The method of claim 44, further comprising:

monitoring the number of subscriber terminals to the file delivery service in the network sector, and changing the representation of the media content based on the determined number of subscriber terminals to the file delivery service in the network sector and bitrates of representations of the media content, to a higher bitrate when the number of subscriber terminals increases or a lower bitrate when the number of subscriber terminals decreases.

46. The method of claim 44, further comprising:

determining, based on the number of subscribers, a percentage of total users in the sector represented by the number of subscribers;

determining an amount of bandwidth allocated to the sector; and determining a proportional amount of the bandwidth allocated to the sector based on the percentage of the total users represented by the number of subscribers, wherein selecting the second representation comprises selecting the second representation when the second representation has a bitrate that can be accommodated by the determined proportional amount of the bandwidth allocated to the sector.

47. A device for outputting information for video data, the device comprising one or more processors configured to obtain media content conforming to an adaptive video streaming network protocol, wherein the media content includes a first representation and a second representation, output a first portion of the media content from the first representation in accordance with a unicast protocol, and output a second portion of the media content from the second representation in accordance with a file delivery service, wherein the first portion and the second portion are temporally consecutive in the media content, wherein segments of the first representation corresponding to the first and second portions have a first temporal duration, wherein segments of the second representation corresponding to the first and second portions have a second temporal duration, and wherein the second temporal duration is longer than the first temporal duration.

48. The device of claim 47, wherein the one or more processors are further configured to output one or more caching primitives in accordance with the file delivery service to cause a client device to cache at least one of the first portion of the media content and the second portion of the media content.

49. The device of claim 47, wherein the one or more processors are further configured to determine a number of subscriber terminals to the file delivery service in a network sector, and select the second representation of the media content based on the determined number of subscriber terminals to the file delivery service in the network sector and bitrates of representations of the media content, wherein to output the data of the media content, the one or more processors are configured to output data of the selected representation, and wherein the one or more processors are further configured to cause the subscriber terminals to download and cache the selected media segments at the bitrate of the selected representation.

50. The device of claim 49, wherein the one or more processors are configured to determine, based on the number of subscribers, a percentage of total users in the sector represented by the number of subscribers, determine an amount of bandwidth allocated to the sector, and determine a proportional amount of the bandwidth allocated to the sector based on the percentage of the total users represented by the number of subscribers, wherein the one or more processors are configured to select the second representation when the second representation has a bitrate that can be accommodated by the determined proportional amount of the bandwidth allocated to the sector.

51. A device for outputting information for video data, the device comprising:

means for obtaining media content conforming to an adaptive video streaming network protocol, wherein the media content includes a first representation and a second representation;

means for outputting a first portion of the media content from the first representation in accordance with a unicast protocol; and means for outputting a second portion of the media content from the second representation in accordance with a file delivery service, wherein the first portion and the second portion are temporally consecutive in the media content, wherein segments of the first representation corresponding to the first and second portions have a first temporal duration, wherein segments of the second representation corresponding to the first and second portions have a second temporal duration, and wherein the second temporal duration is longer than the first temporal duration.

52. The device of claim 51, further comprising means for outputting one or more caching primitives in accordance with the file delivery service to cause a client device to cache at least one of the first portion of the media content and the second portion of the media content.

53. The device of claim 51, further comprising:

means for determining a number of subscriber terminals to the file delivery service in a network sector; and means for selecting the second representation of the media content based on the determined number of subscriber terminals to the file delivery service in the network sector and bitrates of representations of the media content, wherein the means for outputting the data of the media content comprises means for outputting data of the selected representation, and further comprising means for causing the subscriber terminals to download and cache the selected media segments at the bitrate of the selected representation.

54. The device of claim 53, further comprising:

means for determining, based on the number of subscribers, a percentage of total users in the sector represented by the number of subscribers;

means for determining an amount of bandwidth allocated to the sector; and means for determining a proportional amount of the bandwidth allocated to the sector based on the percentage of the total users represented by the number of subscribers, wherein the means for selecting the second representation comprises means for selecting the second representation when the second representation has a bitrate that can be accommodated by the determined proportional amount of the bandwidth allocated to the sector.

55. A non-transitory computer-readable storage medium having stored thereon instructions that, when executed, cause one or more processors to:
- obtain media content conforming to an adaptive video streaming network protocol, wherein the media content includes a first representation and a second representation;
- output a first portion of the media content from the first representation in accordance with a unicast protocol; and
- output a second portion of the media content from the second representation in accordance with a file delivery service, wherein the first portion and the second portion are temporally consecutive in the media content, wherein segments of the first representation corresponding to the first and second portions have a first temporal duration, wherein segments of the second representation corresponding to the first and second portions have a second temporal duration, and wherein the second temporal duration is longer than the first temporal duration.

56. The non-transitory computer-readable storage medium of claim 55, further comprising instructions that cause the one or more processors to output one or more caching primitives in accordance with the file delivery service to cause a client device to cache at least one of the first portion of the media content and the second portion of the media content.

57. The non-transitory computer-readable storage medium of claim 55, further comprising instructions that cause the one or more processors to:
- determine a number of subscriber terminals to the file delivery service in a network sector; and
- select the second representation of the media content based on the determined number of subscriber terminals to the file delivery service in the network sector and bitrates of representations of the media content,
- wherein the instructions that cause the one or more processors to output the data of the media content comprise instructions that cause the one or more processors to output data of the selected representation, and
- further comprising instructions that cause the one or more processors to cause the subscriber terminals to download and cache the selected media segments at the bitrate of the selected representation.

58. The non-transitory computer-readable storage medium of claim 57, further comprising instructions that cause the one or more processors to:
- determine, based on the number of subscribers, a percentage of total users in the sector represented by the number of subscribers;
- determine an amount of bandwidth allocated to the sector; and
- determine a proportional amount of the bandwidth allocated to the sector based on the percentage of the total users represented by the number of subscribers,
- wherein the instructions that cause the one or more processors to select the second representation comprise instructions that cause the one or more processors to select the second representation when the second representation has a bitrate that can be accommodated by the determined proportional amount of the bandwidth allocated to the sector.

* * * * *